United States Patent
Acevedo et al.

(10) Patent No.: US 11,589,006 B1
(45) Date of Patent: Feb. 21, 2023

(54) DYNAMIC CAMERA PRESETS

(71) Applicant: Plantronics, Inc., Santa Cruz, CA (US)

(72) Inventors: Daniel Beyette Acevedo, Austin, TX (US); Andrew Pornthep Pechin, Austin, TX (US); Kishore Venkat Rao Goka, Austin, TX (US); Nhu Quynh Pham Nguyen, Austin, TX (US); Raghavendra Balavalikar Krishnamurthy, Austin, TX (US)

(73) Assignee: PLANTRONICS, INC., Santa Cruz, CA (US)

( * ) Notice: Subject to any disclaimer, the term of this patent is extended or adjusted under 35 U.S.C. 154(b) by 0 days.

(21) Appl. No.: 17/505,432

(22) Filed: Oct. 19, 2021

(51) Int. Cl.
 H04N 7/15 (2006.01)
 G06T 11/60 (2006.01)
 H04N 5/232 (2006.01)

(52) U.S. Cl.
 CPC ............. H04N 7/15 (2013.01); G06T 11/60 (2013.01); H04N 5/23218 (2018.08); H04N 5/23299 (2018.08)

(58) Field of Classification Search
 CPC ........... H04N 7/15; H04N 5/232; G06T 11/60
 USPC ............................................. 348/14.01–14.16
 See application file for complete search history.

(56) References Cited

U.S. PATENT DOCUMENTS

2017/0123616 A1* 5/2017 Battles .................. G06F 3/0484
2018/0089505 A1* 3/2018 El-Khamy ............. G06N 7/005
2020/0285910 A1* 9/2020 Steelberg .............. G06V 20/584
2021/0200210 A1* 7/2021 Gil ........................ G05D 1/0088
2021/0390745 A1* 12/2021 Rykhliuk ................ G06T 11/60

FOREIGN PATENT DOCUMENTS

AU  2008255262 A1 * 7/2010 ............. H04N 7/152

OTHER PUBLICATIONS

Videoconferencing Endpoint Having Multiple Voice-tracking Cameras CN 102256098 A (Feng et al.): Date Published: Nov. 23, 2011.*
"Reviewer's Guide: PictureTel 900 Series Collaboration System", Jan. 1, 2002, 19 pages.
"POLYCOM iPower Collaboration: System Getting Started Guide", Polycom, Inc., Jan. 1, 2003, 16 pages.
"Polycom iPower 9000 Codec: Ultimate Multimedia Platform for Integration", Polycom, Inc., Feb. 1, 2003, 2 pages.
"Special Edition Picturetal 900 Series Unleashed", The Wainhouse Research Bulletin, Aug. 1, 2000, 4 pages.

* cited by examiner

*Primary Examiner* — Melur Ramakrishnaiah

(57) ABSTRACT

A method implementing dynamic camera presets. An image is received. A list of bounding boxes and a list of classification values are generated from the image. A set of tags, for the image, are generated from the list of bounding boxes and the list of classification values. A tagged image incorporating the set of tags into the image is presented. In response to a user input, a tag selection identifying a tag of the set of tags is received. View settings are adjusted to focus on a bounding box, from the list of bounding boxes, corresponding to the tag selection. An adjusted image is presented using the view settings.

20 Claims, 21 Drawing Sheets

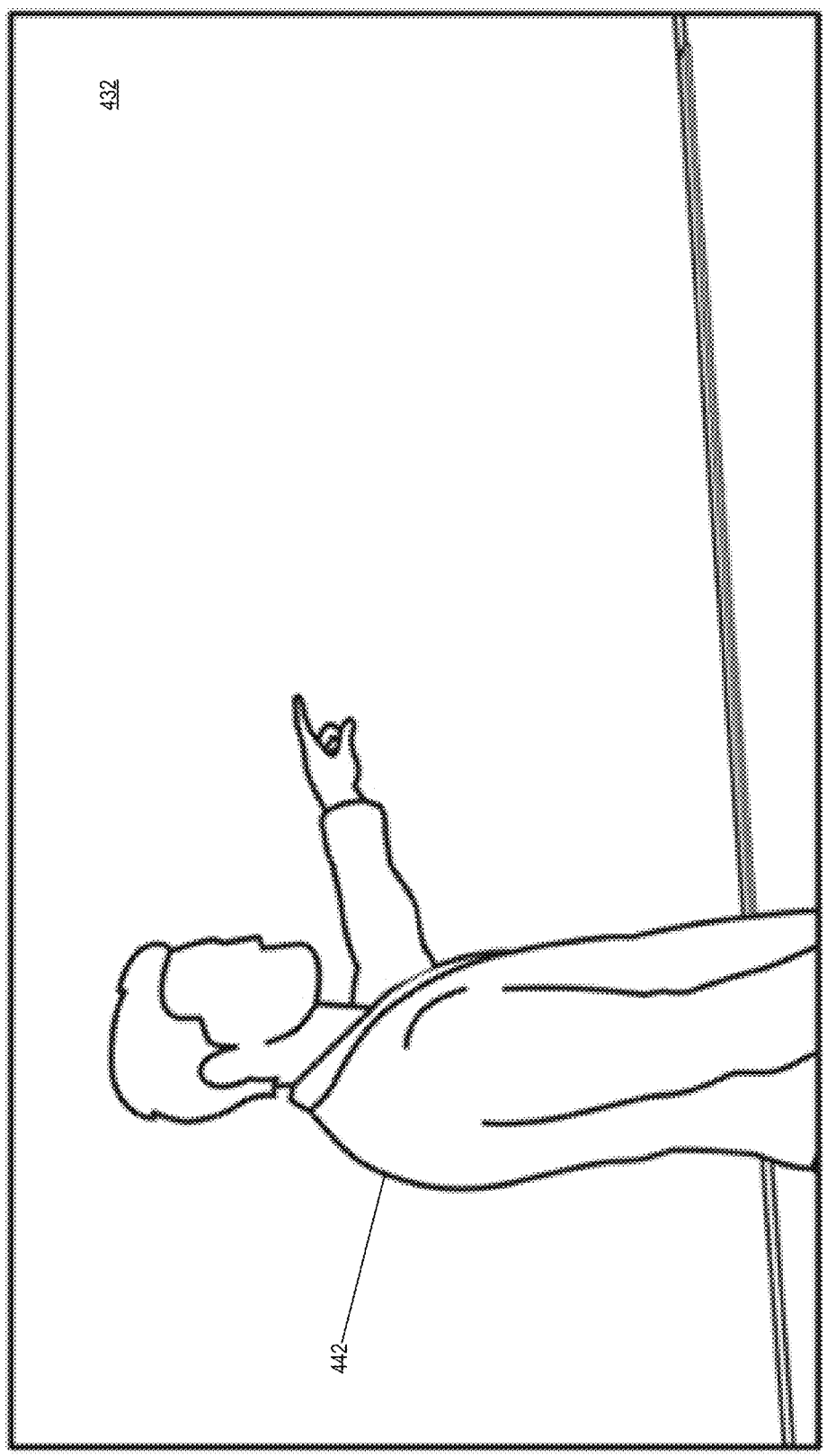

DYNAMIC CAMERA PRESETS

BACKGROUND

Video conferencing solutions are used to share information and connect users between remote locations. Users participating in a video call may control the visual conferencing experience. Currently, manual controls are used for a user to adjust the pan, tilt, and zoom of the camera view to the user's desired position while on a video conference call. Specifically, the user identifies the exact location of the desired position and then manually adjusts the pan, tilt, and zoom of the camera to match the location.

SUMMARY

In general, in one aspect, the invention relates to a method implementing dynamic camera presets. An image is received. A list of bounding boxes and a list of classification values are generated from the image. A set of tags, for the image, are generated from the list of bounding boxes and the list of classification values. A tagged image incorporating the set of tags into the image is presented. In response to a user input, a tag selection identifying a tag of the set of tags is received. View settings are adjusted to focus on a bounding box, from the list of bounding boxes, corresponding to the tag selection. An adjusted image is presented using the view settings.

In general, in one aspect, the invention relates to a system that includes a computing system and an application executing on the computing system. An image is received. A list of bounding boxes and a list of classification values are generated from the image. A set of tags, for the image, are generated from the list of bounding boxes and the list of classification values. A tagged image incorporating the set of tags into the image is presented. In response to a user input, a tag selection is received identifying a tag of the set of tags. View settings are adjusted to focus on a bounding box, from the list of bounding boxes, corresponding to the tag selection. An adjusted image is presented using the view settings.

In general, in one aspect, the invention relates to a system that includes a control device, a display device, a computing system connected to the control device and the display device, and an application executing on the computing system. An image is received. A list of bounding boxes and a list of classification values are generated from the image. A set of tags, for the image, is generated from the list of bounding boxes and the list of classification values. A tagged image incorporating the set of tags into the image is presented to the control device. In response to a user input, a tag selection is received identifying a tag of the set of tags. View settings are adjusted to focus on a bounding box, from the list of bounding boxes, corresponding to the tag selection. An adjusted image is presented to the display device using the view settings.

Other aspects of the invention will be apparent from the following description and the appended claims.

BRIEF DESCRIPTION OF DRAWINGS

FIG. 3, FIG. 4A, FIG. 4B, FIG. 4C, FIG. 4D, FIG. 4E, FIG. 4F, FIG. 4G, FIG. 4H, FIG. 4I, FIG. 4J, FIG. 4K, FIG. 4L, FIG. 4M, FIG. 4N, FIG. 4O, FIG. 4P, and FIG. 4Q show examples in accordance with disclosed embodiments.

DETAILED DESCRIPTION

Figure 1B:
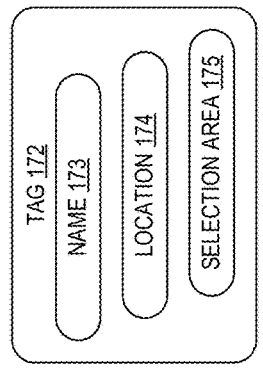
FIG. 1A and FIG. 1B show diagrams of systems in accordance with disclosed embodiments.

In general, one or more embodiments of the disclosure automatically generates and displays dynamic preset camera locations for focusing a camera during a video conference. The camera locations are preset in that the system identifies the locations prior to the user selecting to focus the camera, and dynamic in that the locations may change based on the contents of an image stream. As part of a video conferencing system, images from the video conferencing system are received and machine learning models are used to identify locations for tags for objects detected in the image. Customized presets may be generated for the locations that correspond to the tags for an image. When a user selects a tag, the video conferencing system may pan and zoom to focus on the area of the image identified with the tag.

To generate the tags, machine learning models may be used to generate bounding boxes, classifications, and confidence scores for the objects within the image. The bounding boxes, classifications, and confidence scores are used to process and identify the set of tags for the image. Overlapping bounding boxes may be combined or prioritized to reduce the number of tags. The tags are displayed on images. Upon selection of a tag on an image, the system may change the view settings to pan and zoom to the bounding box associated with the selected tag without the user having to manually pan and zoom.

In one embodiment, bounding boxes may be combined when the objects within the bounding boxes are the same and not when the objects are different. The detection results may be kept for each of the objects if the confidence scores are above the score threshold, which is configurable.

Specific embodiments of the invention will now be described in detail with reference to the accompanying figures. Like elements in the various figures are denoted by like reference numerals for consistency.

Figure 1A:
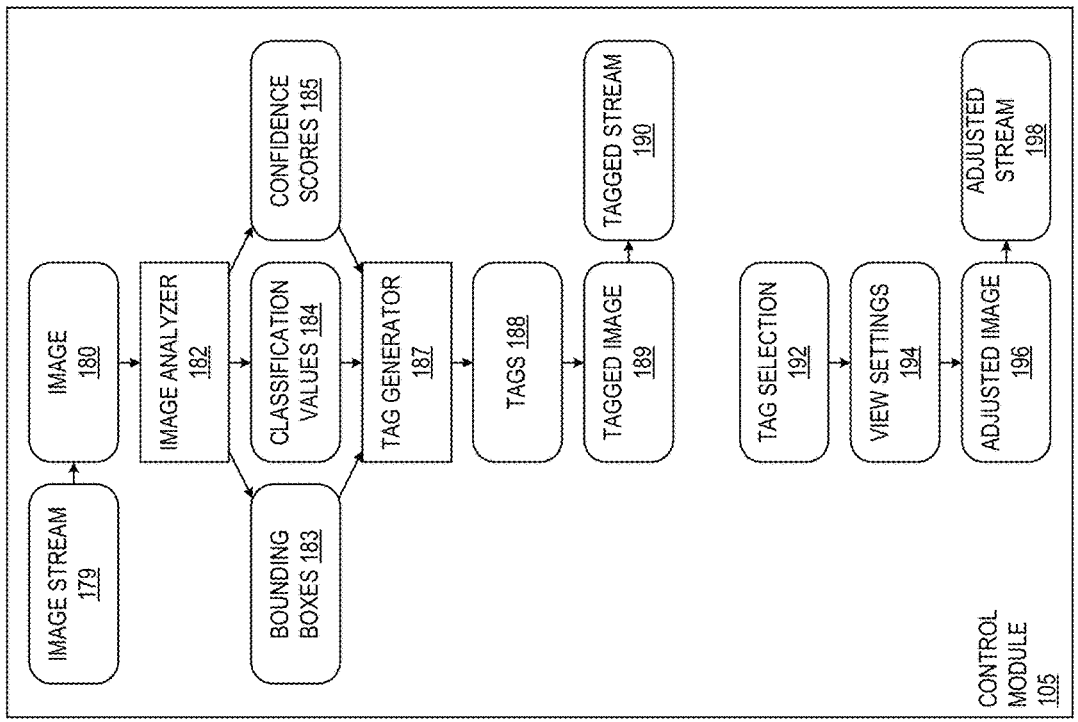
Figure 5A:
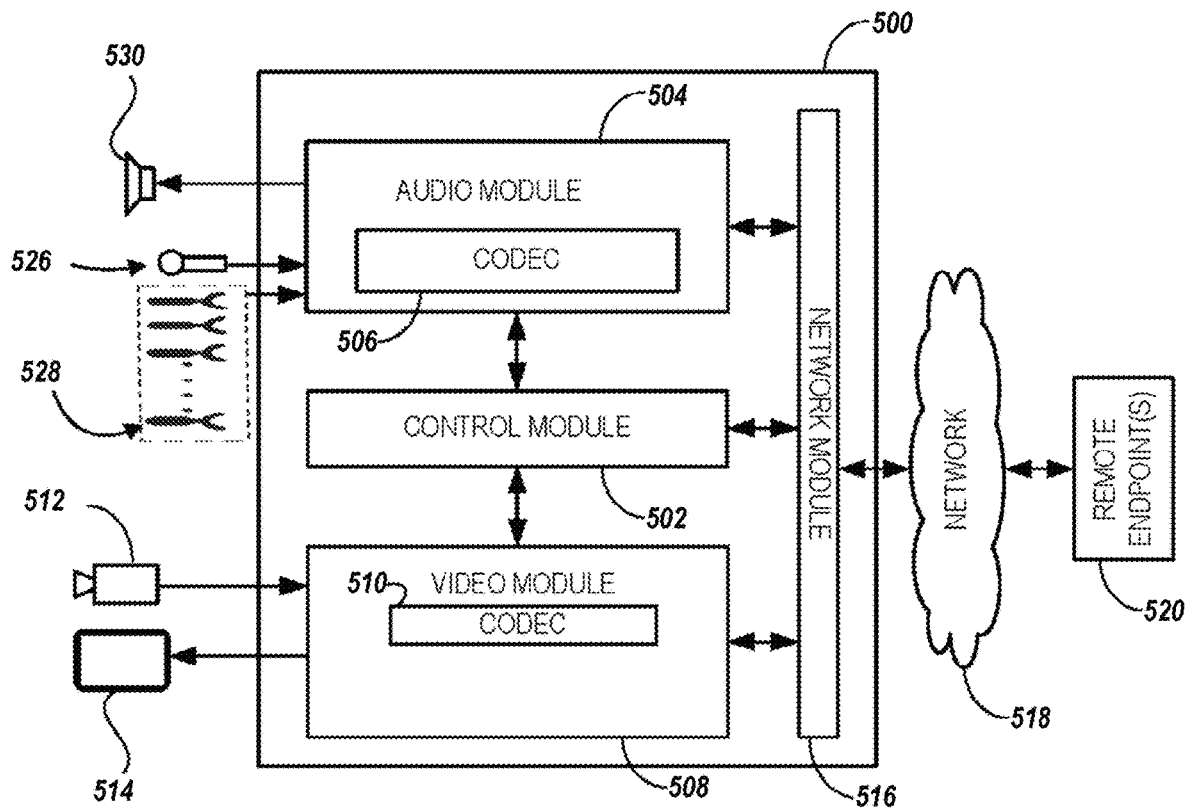
FIG. 5A and FIG. 5B show computing systems in accordance with disclosed embodiments.
Figure 5B:
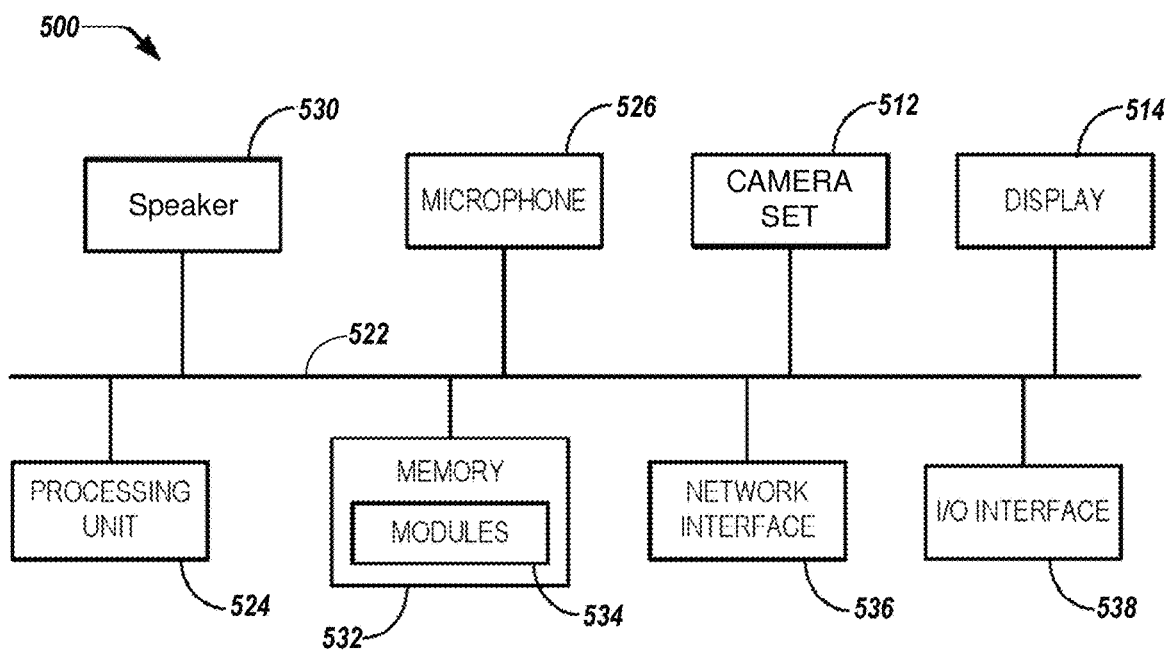

FIG. 1A shows a control module (105) for controlling a camera that processes data using components. The control module (105) may be part of a conferencing endpoint, such as shown in FIG. 5A and FIG. 5B, includes the control module (105). The control module (105) may be located on the same or a different device than the camera.

The control module (105) processes the image stream (179) to generate the tagged stream (190) and processes the tag selection (192) to generate the adjusted stream (198). The control module (105) dynamically generates tags (188) for the image stream (179). The control module (105) may present the tags (188) and control views of the video generated by a camera.

The image stream (179) is a stream of video images (also referred to as a video stream) captured by a camera. In one embodiment, the image stream (179) provides a view of a conference room.

An image (180) is one of the images from the image stream (179). The image (180) is extracted from the image stream (179) and processed by the image analyzer (182). In one embodiment, each image from the image stream (179) may be processed. In one embodiment, only a portion of the images are processed to reduce the amount of processing power used.

The image analyzer (182) generates the bounding boxes (183), the classification values (184), and the confidence scores (185) from the image (180) using machine learning models. Different machine learning models may be used to generate each of the bounding boxes (183) and the classification values (184). In one embodiment, a regional convolutional neural network is used to identify the bounding boxes (183) from the image (180).

The bounding boxes (183) identify the locations of objects within the image (180). In one embodiment, a bounding box, from the bounding boxes (183), includes a data structure with four coordinates that identify the top left corner of the box along with the width and height of the box (left, top, width, height). The bounding box identifies the boundaries of the object within the image (180). Multiple bounding boxes may overlap for objects that are adjacent or overlapping each other. The bounding boxes (183) may be generated with a machine learning model that identifies the locations and boundaries for each object in an image.

The classification values (184) identify the types of objects for the objects within the bounding boxes (183). The types of objects may include people, furniture, areas (e.g., an area of a conference room), groups of people, etc. In one embodiment, the classification values (184) and the bounding boxes (183) correspond in a one to one manner. In one embodiment, the classification values (184) may be an integer value that maps to a string value for a word or phrase that identifies the object. In one embodiment, the classification values (184) may be the strings that represent the names of the types of objects. Each object in an image has a corresponding bounding box defining the location of the object and a corresponding classification value identifying the type of object.

The confidence scores (185) identify probabilities that the classification values (184) are correct. An individual confidence score may exist for each classification value. The confidence scores (185) may be floating point values from "0" to "1" with "0" indicating no confidence and "1" indicating full confidence.

In one embodiment, a machine learning model generates a classification vector from the image (180) that corresponds to a box from the bounding boxes (183). The classification vector includes elements for each of the types of objects that may be identified within the image (180). The element of the classification vector with the highest confidence value (also referred to as the highest value) may be saved as the confidence score for the classification value for the object of a bounding box.

As an example, a classification vector may include elements identified as "person", "speaker", "seating", "table", "audience", "display", etc., with values of "[0.883602691, 0.007223969, 0.016037731, 0.008946416, 0.003498537, 0.003706264, . . . ]". The value of 0.883602691 indicates an 88.3602691% probability that the object is a person and is the highest value in the classification vector. The element with the value 0.883602691 identifies the object as a person with a confidence of 88.3602691%.

The tags (188) are generated by the tag generator (187). A tag is a label identifying an object type that is attached to the object in the image stream. The tags (188) may include the tag (172), described below with FIG. 1B. The tags (188) each include a name, a location, and a selection area, as described below with FIG. 1B. In one embodiment, the name may be displayed without the other details.

The tag generator (187) generates tags (188) from the bounding boxes (183), the classification values (184), and the confidence scores (185). In one embodiment, the tag generator (187) may identify bounding boxes that overlap and combine the overlapping bounding boxes. In one embodiment, the tag generator (187) prioritizes overlapping bounding boxes. In one embodiment, a tag is generated for the bounding box with the highest priority from a group of overlapping bounding boxes. In one embodiment, the tag is generated for the bounding box with the highest priority from a group of overlapping bounding boxes of the same class. For example, when the bounding boxes for a person and a piece of furniture overlap, the bounding box for the person may have a higher priority than the bounding box for the furniture, and the tag generator (187) may generate a tag for the bounding box for the person without generating a tag for the bounding box for the furniture. In one embodiment, tags may be generated for each bounding box regardless of priority. In one embodiment, the priority may be an integer value stored as part of a bounding box data structure that stores coordinates of the bounding box with the priority of the bounding box.

Tagged image (189) is an image generated from the image (180) and the tags (188) by the control module (105). In one embodiment, the tagged image (189) is generated by writing the names (also referred to as tag names) of the tags (188) onto the image (180) at the locations (also referred to as tag locations) identified by the tags (188).

The tagged stream (190) is a video stream that incorporates the tags (188) into the image stream (179). In one embodiment, a set of tags are generated for each image from the image stream (179) and are correspondingly added to each image of the tagged stream (190). In one embodiment, a set of tags is generated for a subset of images from the image stream (179). Tags from the most recently tagged image may be displayed on a subsequent image when a set of tags is not generated for the subsequent image. The tagged stream (190) may be presented to a control device, e.g., a local computing device (such as a tablet computer), a remote computing system (such as a remote endpoint), a touch controller connecting to the system through a short range wireless network (e.g., Bluetooth), etc.

The tag selection (192) is an identification of one of the tags (188) that has been selected by a user of the systems. The tag selection (192) may identify a particular tag along with the tagged stream from which the selected tag was displayed. In one embodiment, the tag selection (192) is received from a touch device displaying the tagged image (189) from the tagged stream (190).

The view settings (194) are the pan and zoom settings for the image stream (179). In one embodiment, the view settings (194) are digital settings that identify a visible window within an image to form a view. In one embodiment, the view settings (194) are mechanical settings that identify physical rotation and zoom values for a camera to form a view. In one embodiment, the view settings (194) are digital settings for pan and zoom that identify a subimage within the images from the image stream.

The view settings (194) are adjusted based on the tag selection (192). For example, in response to the tag selection (192), the view settings (194) may be updated to fit a view to the bounding box that corresponds with the tag identified in the tag selection (192).

The adjusted image (196) is an image formed after the view settings (194) have been applied. In one embodiment, the adjusted image (196) is a window of a larger image. In one embodiment, the adjusted image (196) is from a camera to which the view settings (194) have been applied.

The adjusted stream (198) is the stream of adjusted images, including the adjusted image (196), that is displayed or presented. The adjusted stream (198) shows the object identified and tagged from the image (180) from the image stream (179).

Turning to FIG. 1B, the tag (172) is generated by an endpoint for a bounding box identified from an image captured with a camera. The tag (172) includes the name (173), the location (174), and the selection area (175).

The name (173) is the name of the tag (172). The name (173) may be generated from a classification value of the object within the bounding box identified from the image.

The location (174) is the location of the tag (172) with respect to the image captured by an endpoint and may identify the coordinates of the center of the tag when displayed on the image. The location (174) may correspond to the location of the bounding box. For example, the location (174) may correspond to a center of the bounding box. In one embodiment, the location (174) may be at center of the bottom third of the image, i.e., at the center of a line that is one third of the way from the bottom of the bounding box to the top of the bounding box.

The selection area (175) is the area within the image that, when selected by a user, registers as a selection of the tag (172). In one embodiment, the selection area (175) includes the area of the tag (172) when displayed on the image. In one embodiment, the selection area (175) includes the area of the bounding box to which the tag (172) corresponds.

Figure 2:
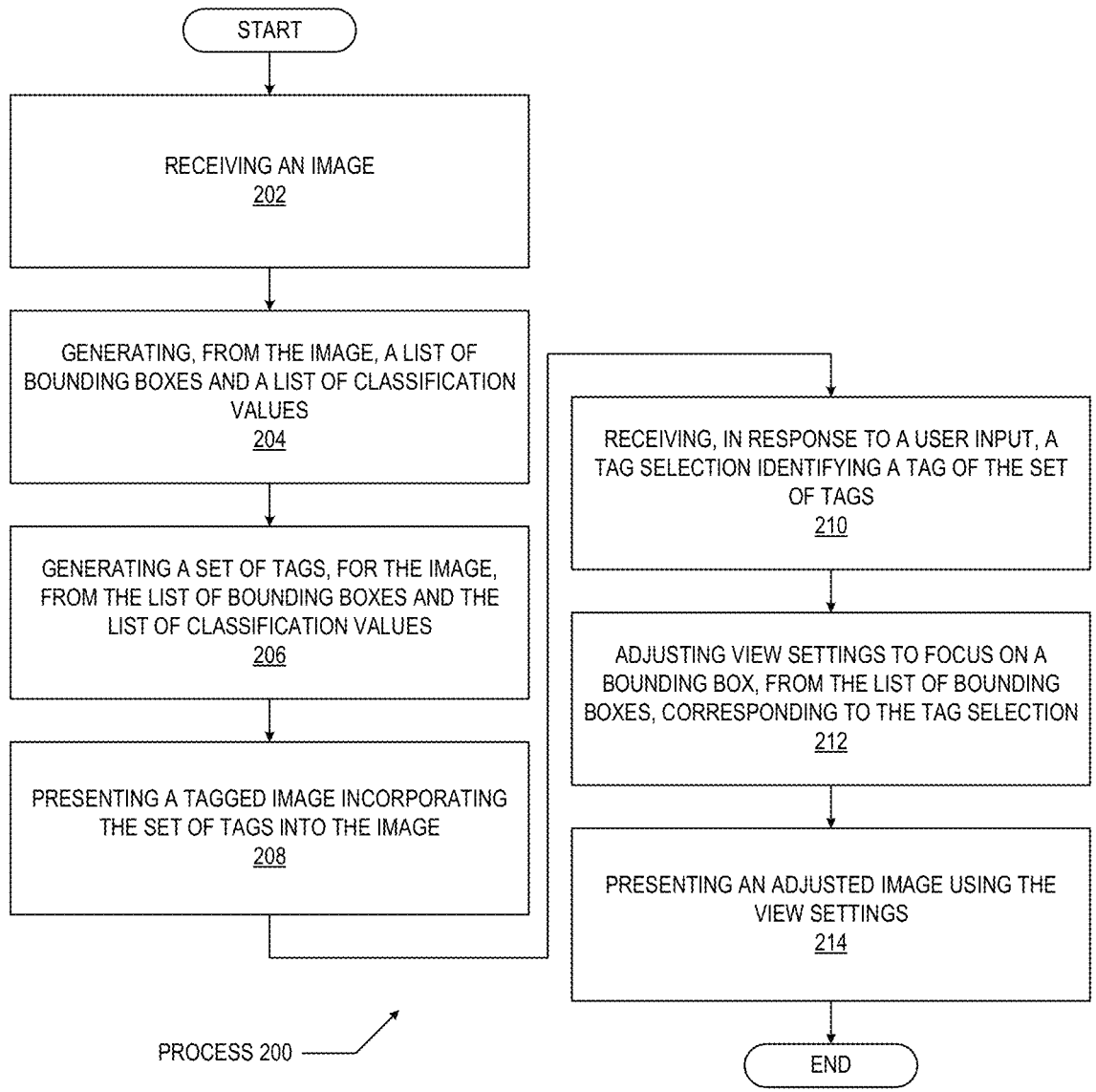
FIG. 2 shows a flowchart in accordance with disclosed embodiments.

FIG. 2 is a flowchart of the process (200) of generating and using dynamic camera presets to control video streams, in accordance with embodiments of the present disclosure. The process (200) may be performed by the control module (105) of FIG. 1A.

Turning to FIG. 2, in Block (202), an image is received. The image may be extracted from a video stream captured by a camera of a video conferencing system. The image may be an overview image that provides a wide view of a conference room. In one embodiment, the image is received as part of a real time stream from a camera.

In Block 204, a list of bounding boxes and a list of classification values are generated from the image. The classification values may be integers or strings that identify the names of the objects in the images. A bounding box, from the list of bounding boxes, includes a set of coordinates that define a portion of the image within which an object in the image is detected. A classification value, from the list of classification values, identifies a classification for an object detected in the image. The classification identifies the type of object detected within the image for a bounding box.

The system may maintain multiple lists of bounding boxes, including a list of bounding boxes for objects tagged on a display and a list of bounding boxes with entries for each object identified in an image. The list of bounding boxes for objects tagged on a display may be a subset of the list of bounding boxes with entries for each object identified in an image. In one embodiment, the system may generate the list with entries for each object and then combine or remove different bounding boxes from a copy of the list to generate the list of bounding boxes for objects displayed with tags.

The bounding boxes and classification values may be generated by machine learning models. The machine learning models may include two-stage detectors and single stage detectors (SSD (single shot multibox detector), YOLO (you only look once), etc.). In one embodiment, the machine learning model for object detection may be a two-stage detector or a single stage detector.

The machine learning models may be trained using supervised training to predict the label of previously labeled images. The previously labeled images are input to the machine learning model, the machine learning model generates a predicted label from the image, the predicted label is compared to the label for the image. The weights of the machine learning model may be updated based on the difference between the predicted label and the label for the image using backpropagation.

Two-stage detectors include (fast-RCNN (region-based convolutional neural networks), faster-RCNN, mask-RCNN, etc.). A two-stage detector such as Faster R-CNN or mask R-CNN, uses a region proposal network as a part of the machine learning model to generate regions of interests in the first stage of the model. The model sends the region proposals down a pipeline for object classification and bounding-box regression. Two stage detectors achieve a higher accuracy rate and may use more computing power than one stage models. Two stage detectors are used in systems without computational resource constraints. Such computing systems may include graphics processing units (GPUs) and be cloud based to generate inferences with the machine learning model.

A single stage detector such as YOLO (you only look once) and SSD (single shot multi-box detector), treats object detection as a simple regression problem by taking an input image and learning to output the classification values and coordinates for bounding boxes. Single stage models may have less accuracy than the two-stage models but may execute using less computational resources. Single stage detectors are typically used in a resource constrained environment such a video bar conferencing system.

The bounding boxes for the objects detected in an image may overlap. Bounding boxes that overlap, and which may be of the same class, may be combined or removed from the list of bounding boxes that get further processed and tagged. The distance between bounding boxes, the classification values of the objects in the boxes, and the priorities for the classifications may be used to combine or remove bounding boxes from the list of bounding boxes.

Bounding boxes may be combined when the distance (e.g., the Euclidean distance) between the centers of the bounding boxes are within a threshold distance and the classification values are the same. For example, when the centers of two bounding boxes are within a threshold distance (e.g., 50 pixels) and the objects within the bounding boxes are classified as people, then the bounding boxes may be combined. The combined box may be generated from the two bounding boxes by identifying the left-most, top-most, right-most, and bottom-most coordinates from the coordinates for the two original bounding boxes. The combined box may be added to the list of bounding boxes and the two original boxes may be removed from the list of bounding boxes.

In one embodiment, the amount of overlap between bounding boxes may be used to combine or remove bounding boxes. The amount of overlap may identify a percentage of the number of overlapping pixels to the total number of pixels of a first bounding box with respect to a second box. When the percentage satisfies a threshold (e.g., 80%), then the first box may be removed from the list of bounding boxes. The first box may also be combined with the second box when the classification values of the objects match.

Bounding boxes may be removed when the types of objects within the bounding boxes have different priorities. For example, a piece of furniture may have a lower priority than a person. When a bounding box for a chair overlaps with a bounding box for a person, the bounding box for a chair may be removed from the list of bounding boxes.

In addition to the bounding boxes and classification values, the machine learning models may generate, from the image, a list of confidence scores. A confidence score, from the list of confidence scores, identifies an accuracy of a classification value, from the list of classification values, of an object detected in the image.

In Block 206, a set of tags, for the image, is generated from the list of bounding boxes and the list of classification values. In one embodiment, a tag includes a name, a location, and a selection area. A tag may be generated for each bounding box and corresponding classification value from the list of bounding boxes and the list of classification values. Tags, from the list of tags, may correspond to bounding boxes, from the list of bounding boxes, in a one to one relationship.

In one embodiment, the name of a tag is a string. The string, mapped from the classification value, includes a word or phrase that identifies the object associated with a tag and is within the bounding box corresponding to the tag. When the bounding boxes of two people are combined, the name may be updated to identify that the tag is related to a group of people instead of a single person.

In one embodiment, the location is a set of "x, y" coordinates that identify the display location of the tag within the image. The location of the tag is generated from the coordinates of the bounding box. The type of classification (e.g., whether an object is a piece of furniture or a person) may be used to generate the location. For example, a tag may be located in the center of the top third of a bounding box (e.g., in the center of a line that is one third of the way from the top of the bounding box to the bottom of the bounding box) for a piece of furniture to reduce occlusion of the furniture with the tag. A tag may be located in the center of the bottom third of a bounding box for a person to prevent occlusion of the tag with a face of the person. In one embodiment, the location of the face of the person may be separately detected and the tag may be prevented from being displaying directly onto the face of the person.

In one embodiment, the selection area identifies the area of the image that may be used to select the tag by a user. In one embodiment, the selection area includes the area on the image in which the tag is displayed. The selection area may also include the area of the bounding box in addition to the display area of the tag.

In one embodiment, the system generates sound source location data. The sound source location data identifies the horizontal location of the primary sound source in the image. When the horizontal location intersects with the bounding box of a person, the name of the tag for the person may be updated to identify the person as the "presenter" or "speaker". In one embodiment, an asterisk "*" (or some other symbol) may be appended to the name of the tag that intersects with the horizontal location of sound source identified by the sound source location data. Other visual aspects may be changed, including the color of the tag, the font of the tag, the color of the font of the tag, etc.

In Block 208, a tagged image is presented that incorporates the set of tags into the image. In one embodiment, the tagged image may be generated by overlaying the tags from the set of tags onto the original image. A name of a tag is overlaid onto the image at the coordinates for the location of the tag. In one embodiment, the tagged image is part of a tagged stream that is transmitted to a control device that displays the tagged image from the tagged stream. For example, the control device may be a control tablet paired with a video bar of a video conferencing system. As another example, the control device may be a remote computing system (desktop computer, laptop computer, smart phone, video conferencing system, etc.).

In Block 210, in response to a user input, a tag selection is received that identifies a tag of the set of tags. The tag selection may be from a user input to a control device. For example, the control device presents the tagged image and a user of the control device may touch one of the tags displayed in the tagged image on the control device.

In Block 212, view settings are adjusted to focus on a bounding box, from the list of bounding boxes, that corresponds to the tag selection. In one embodiment, the view settings identify the pan and zoom values to focus on the bounding box and generate an adjusted image. The aspect ratio of the adjusted image may be the same as the aspect ratio of the original image (e.g., 16:9). When the aspect ratio of the bounding box is not as wide as the aspect ratio of the original image (e.g., 8:9) then the top and bottom of the view settings are adjusted so that the adjusted image is fit to the top and bottom of the bounding box. When the aspect ratio of the bounding box is not as tall as the aspect ratio of the original image (e.g., 16:4) then the width and horizontal placement of the view settings are adjusted so that the adjusted image is fit to the left and right sides of the bounding box.

In one embodiment, a framing algorithm may be used to adjust the view settings and focus on the object in the bounding box. For example, when the object is a person and after the view settings are adjusted to fit the bounding box, the view settings may be further adjusted. For example, the view settings may be further adjusted to have the eyes of the person at the bottom of the top third of the image output from the system, which may be referred to as the rule of thirds.

As another example, a framing algorithm frames the movement of a subject. A subject is a person who may be the speaker. The framing algorithm may identify an orientation of the face and body of the person. The face orientation may be identified using facial analytics algorithms, which may include facial landmarks and head pose estimation. The body orientation may be identified using body analytics, which may include body pose estimation. Based on the face and body orientations, the system may frame the subject with additional space, called looking space, to show where the subject is looking.

Framing algorithms may also predict the flow of movement of the subject and provide additional lead room into which the subject may move. The additional lead room may reduce the number of framing adjustments made when the speaker moves from one direction to another. The face and body analytics may use additional machine learning models as well as traditional computer vision algorithms or methods for face and body analytics that do not use machine learning.

In Block 214, an adjusted image is presented using the view settings. The adjusted image may be presented by transmitting the adjusted image to a display.

In one embodiment, an adjusted stream, including the adjusted image, is presented to the display device. The adjusted stream shows the dynamic preset (i.e., the view generated using the tag) selected with the control device. In one embodiment, the adjusted stream is transmitted to a display connected to a video bar of a video conferencing system.

Figure 3:
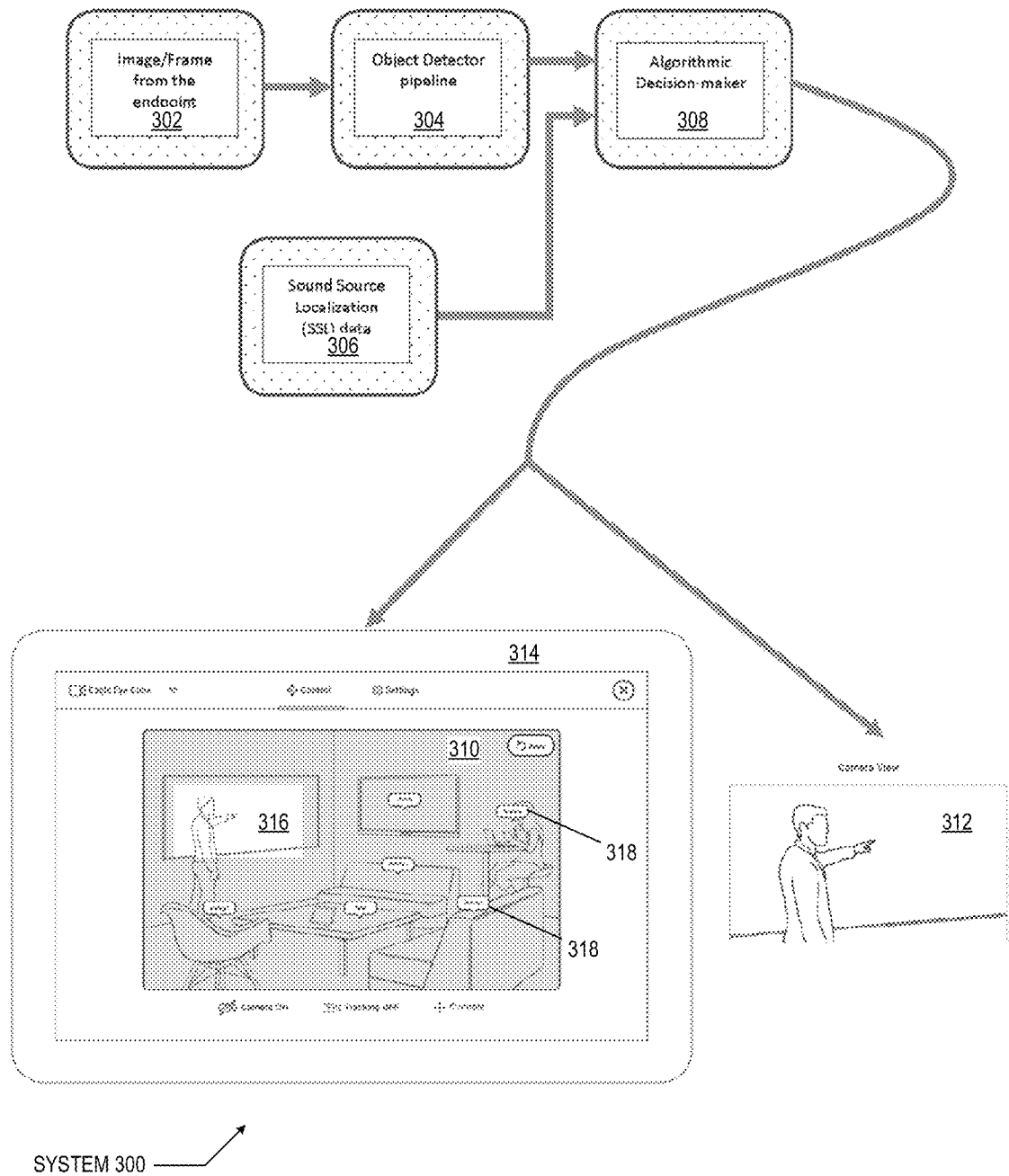
Figure 4A:
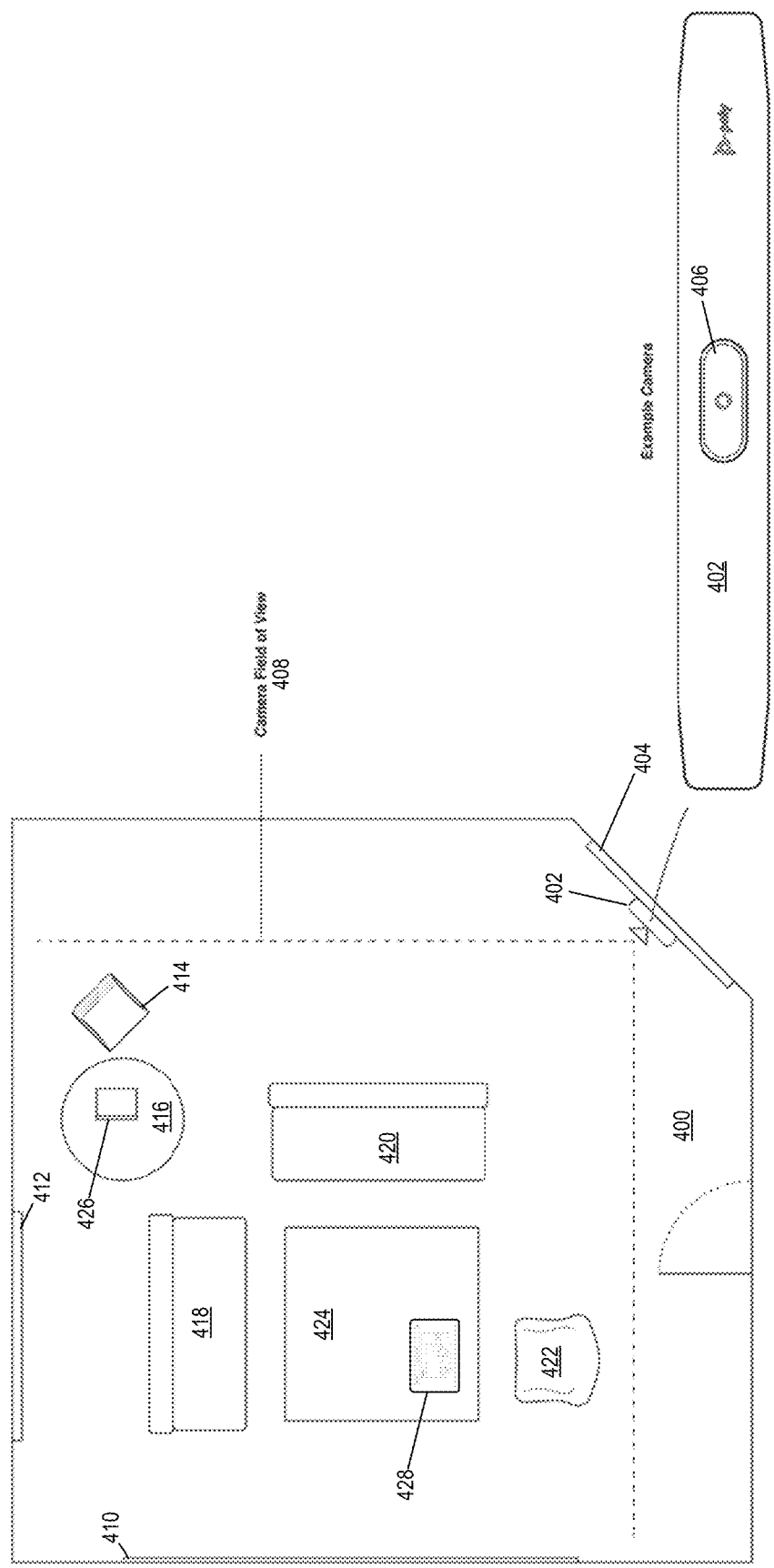
Figure 4B:
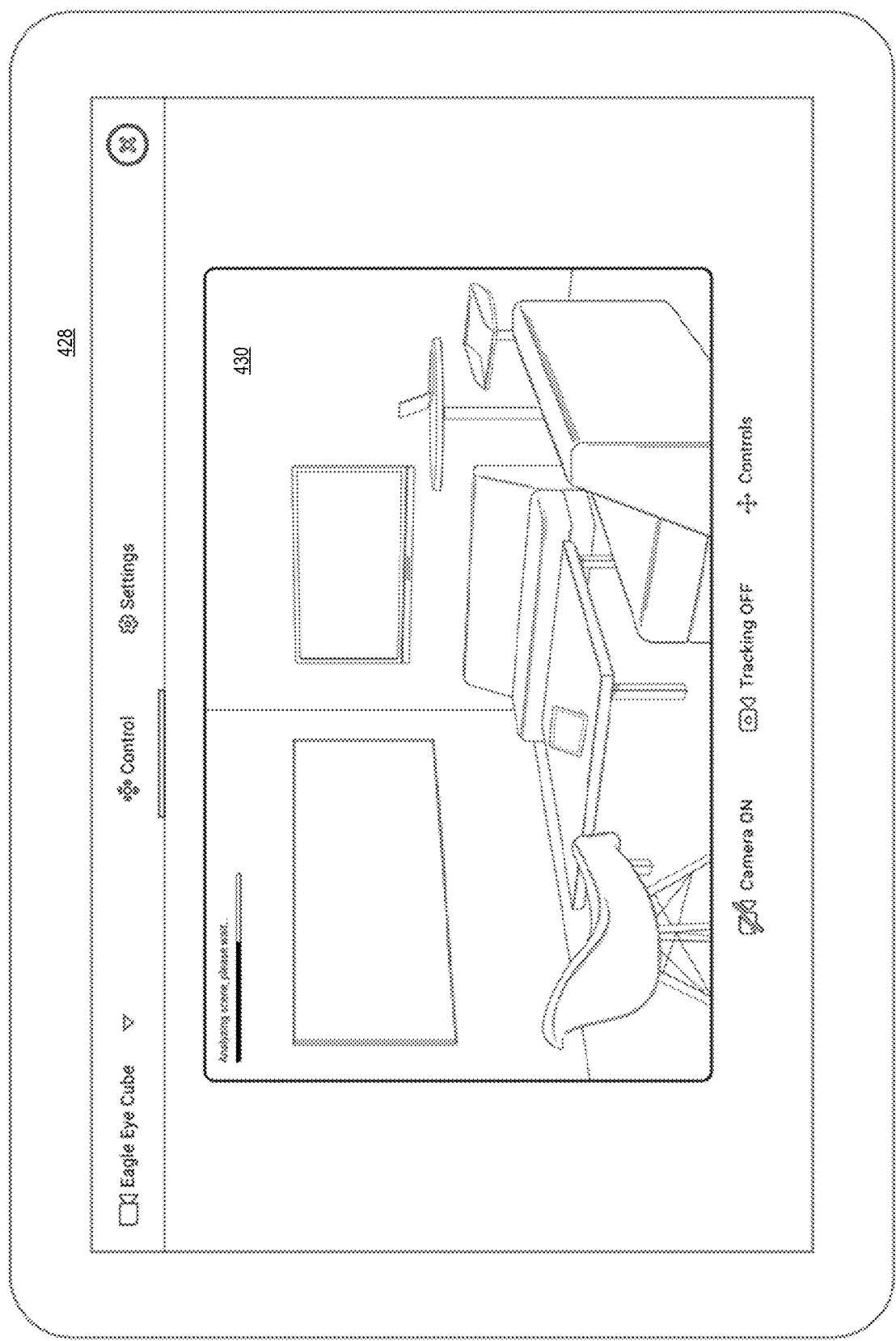
Figure 4C:
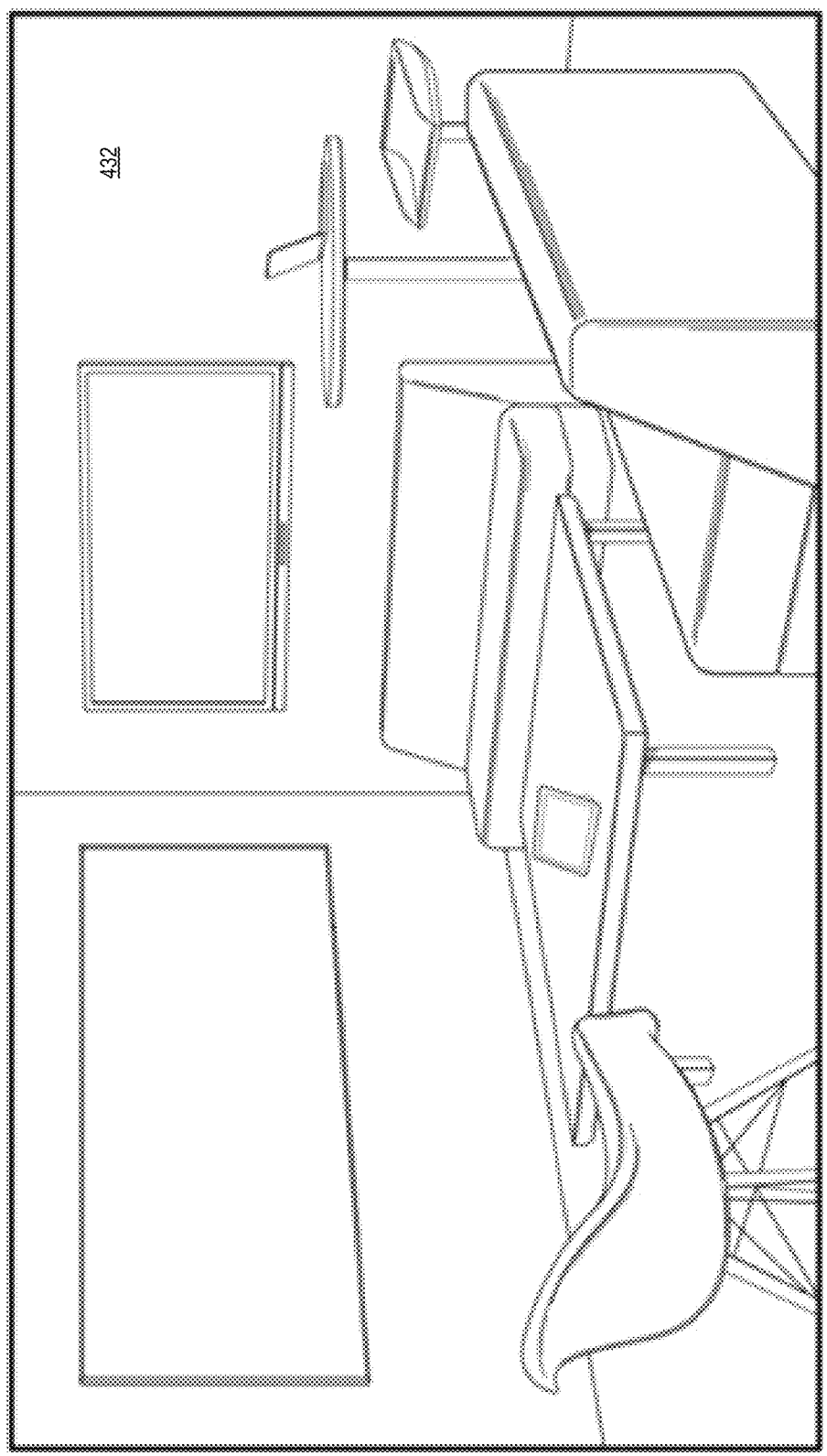
Figure 4D:
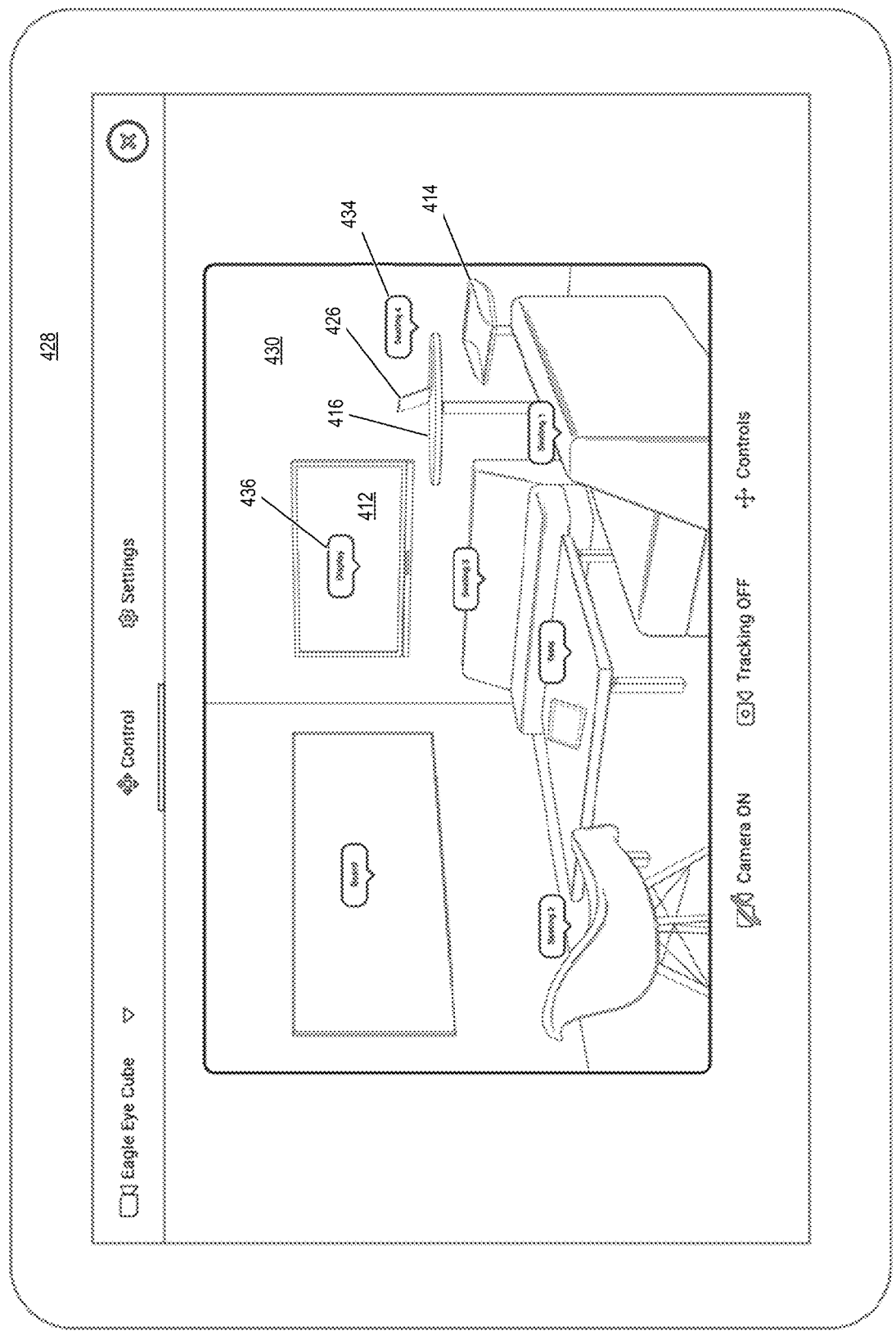
Figure 4E:
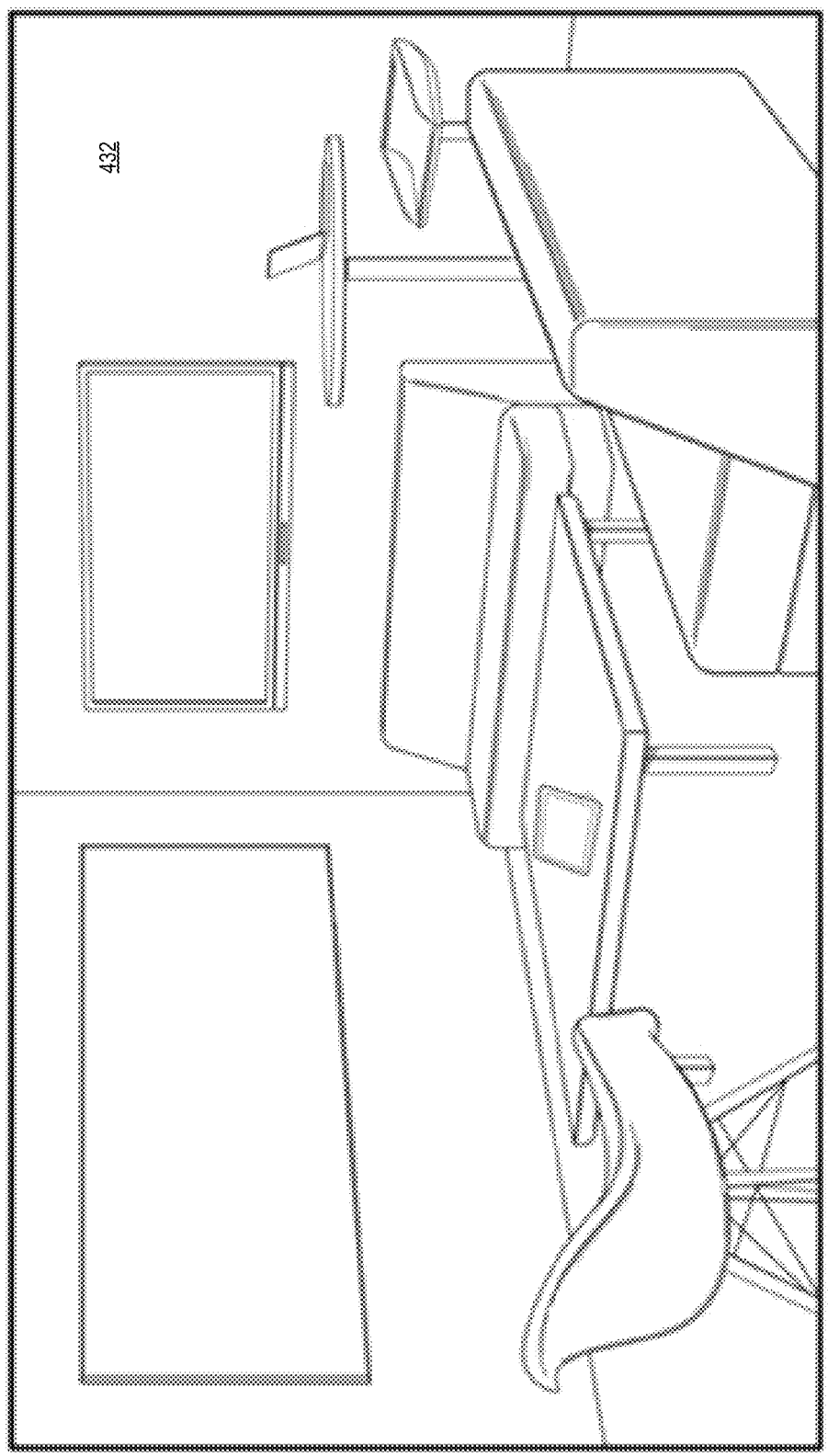
Figure 4F:
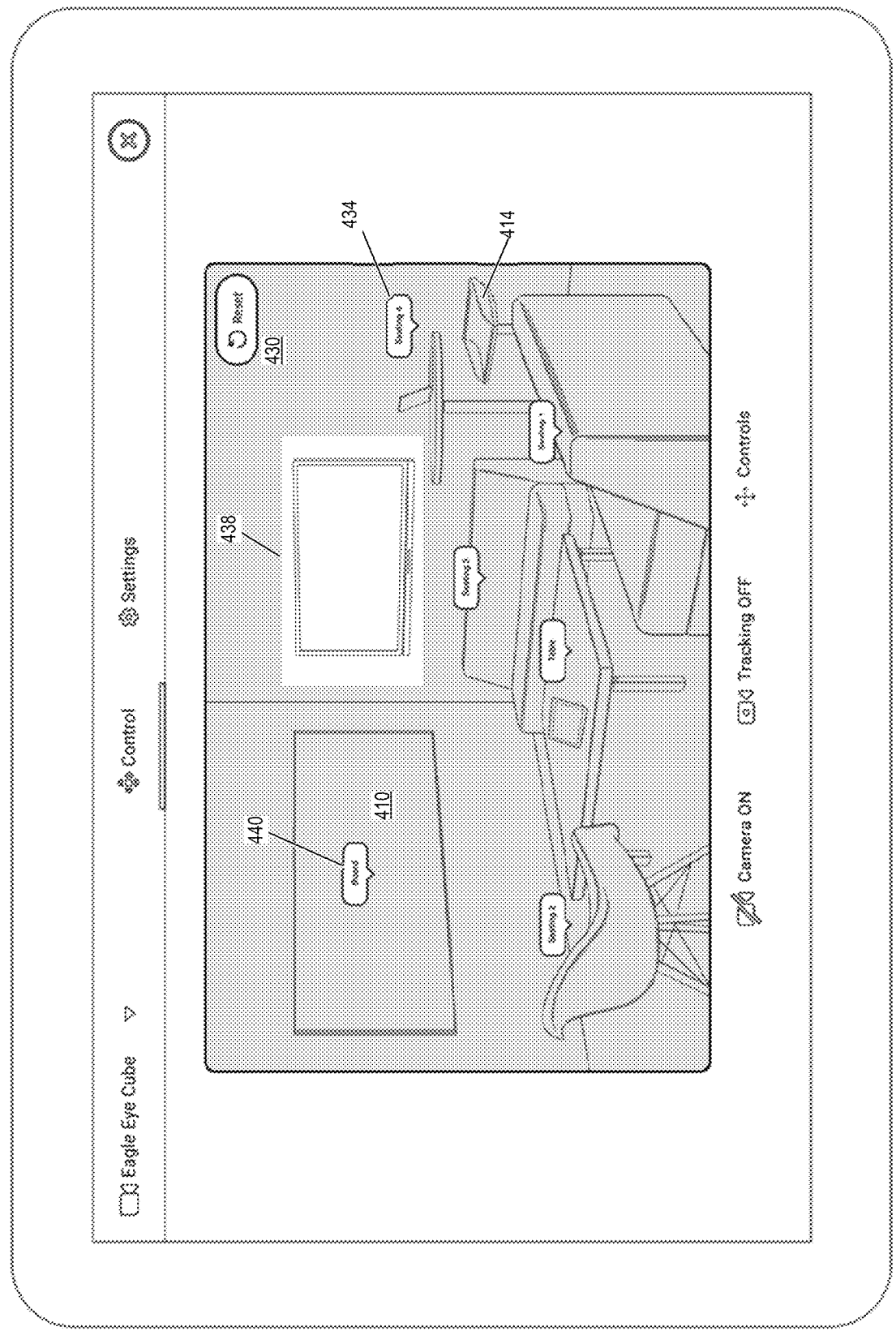
Figure 4G:
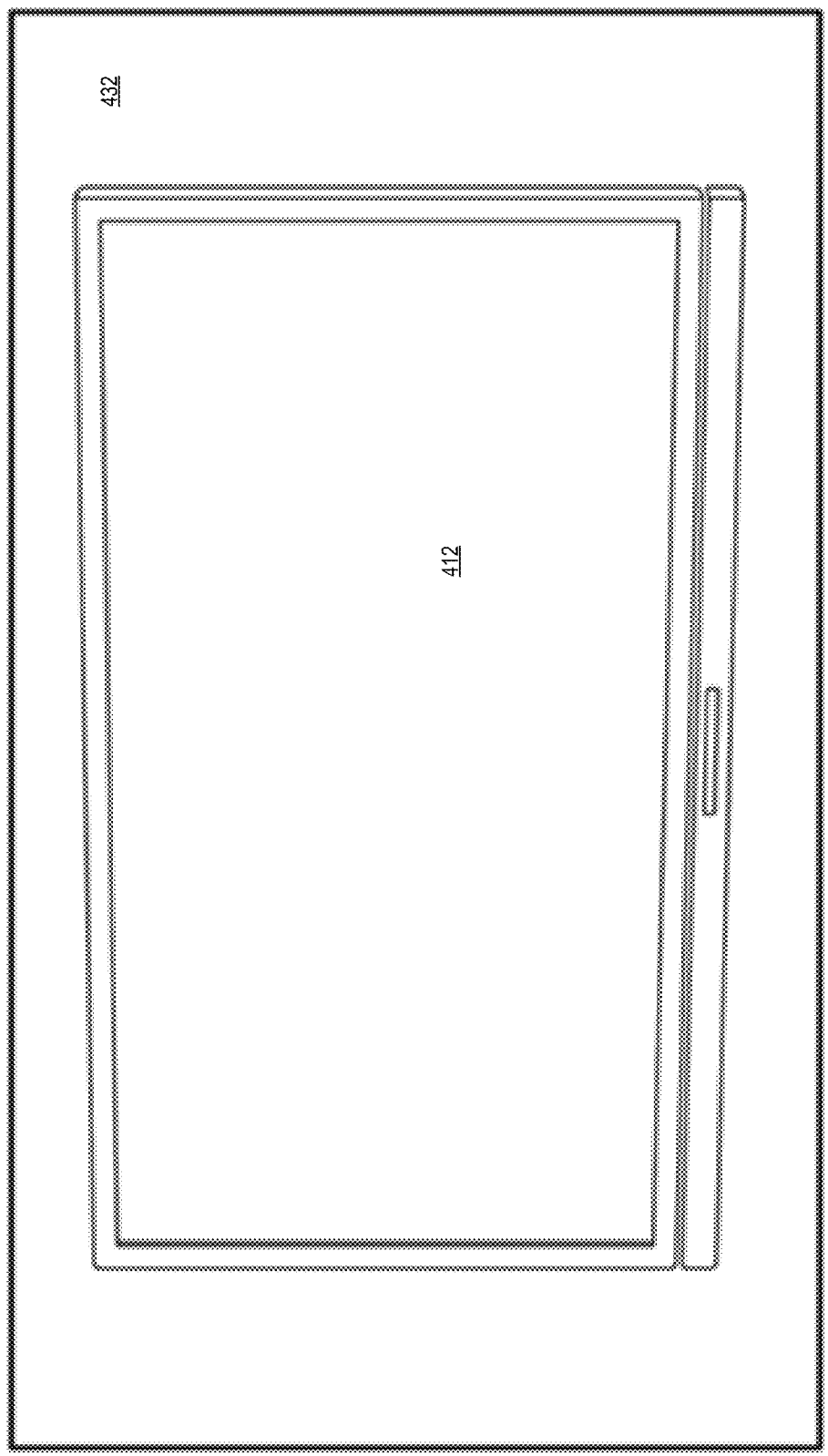
Figure 4H:
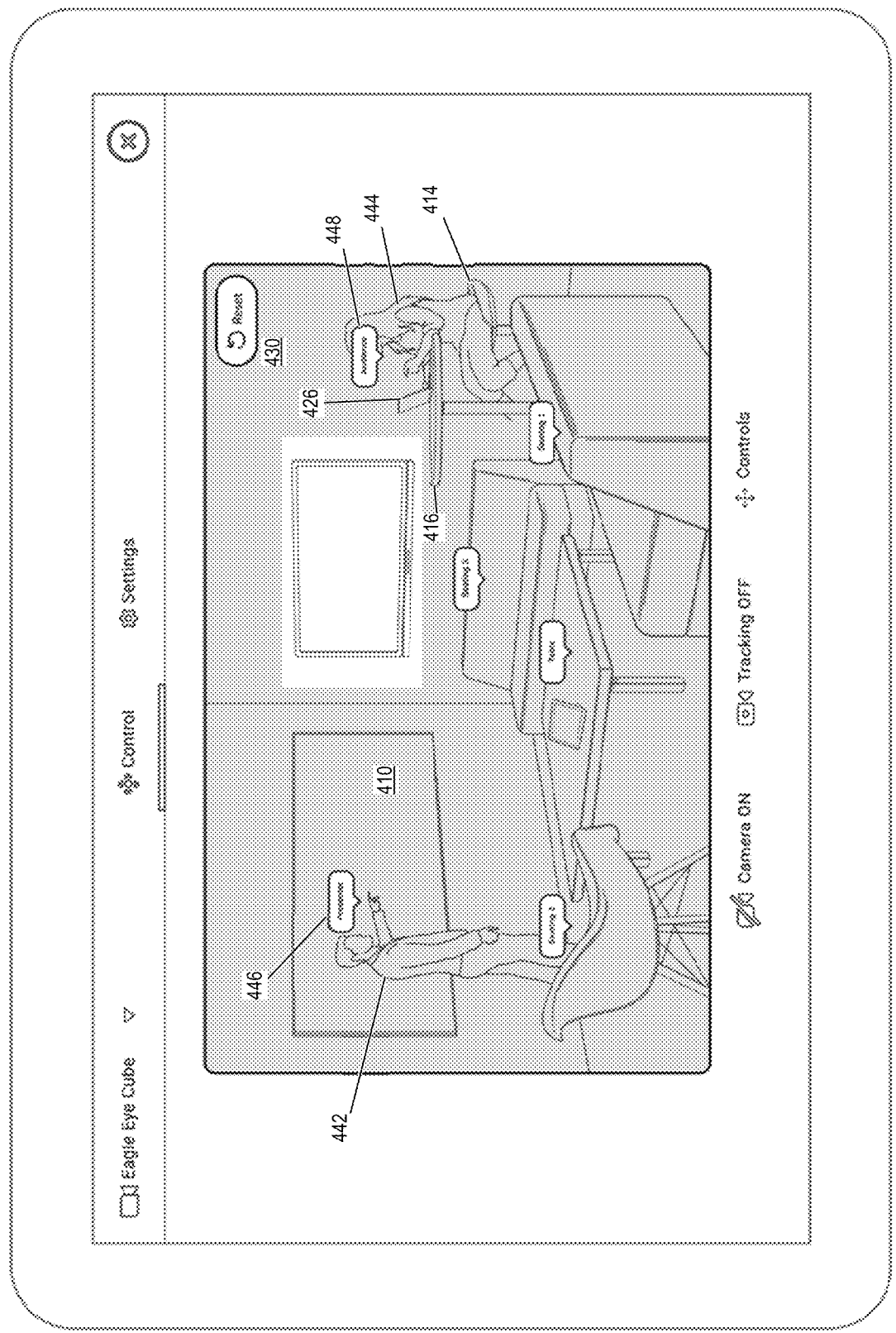
Figure 4I:
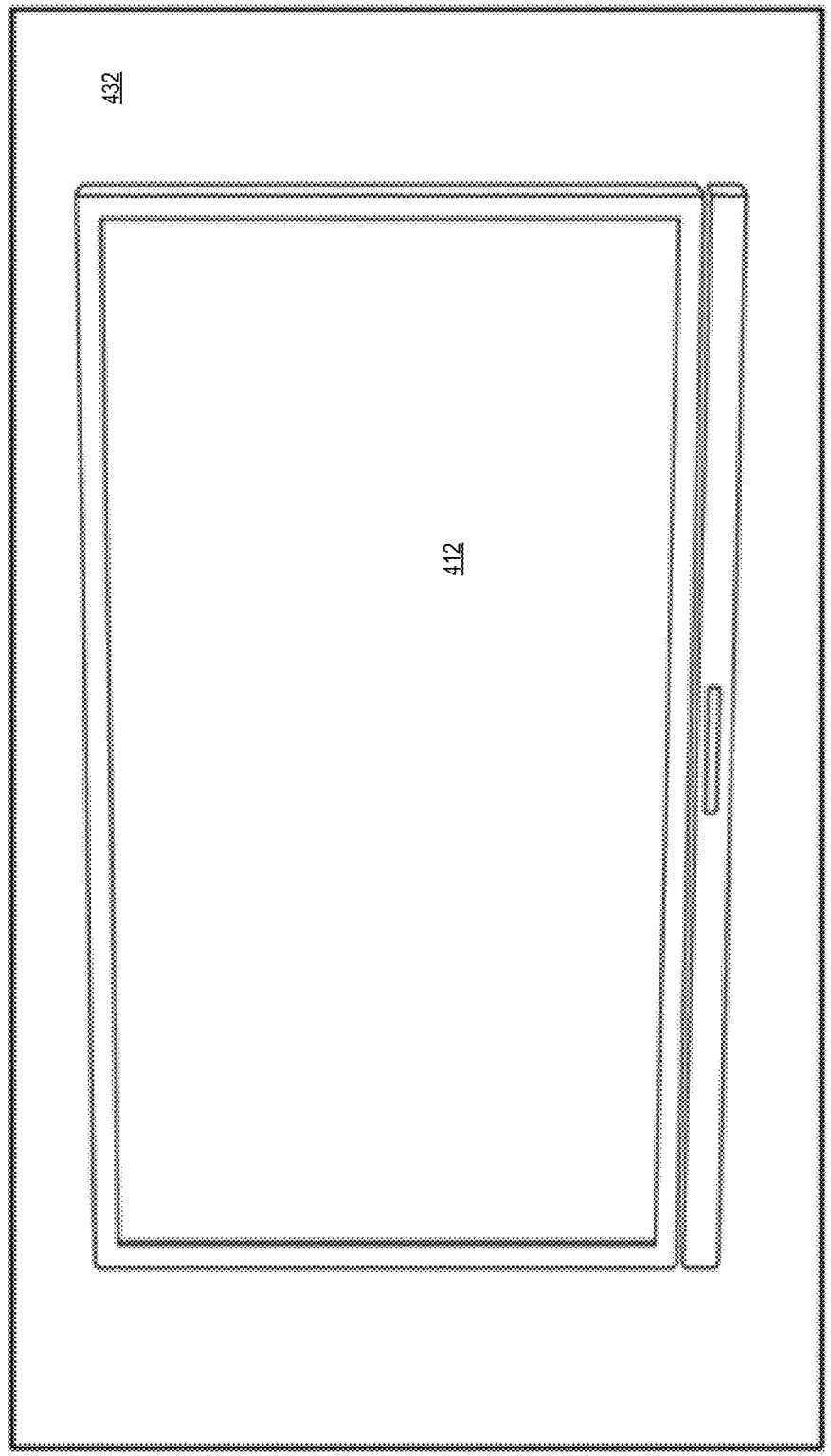
Figure 4J:
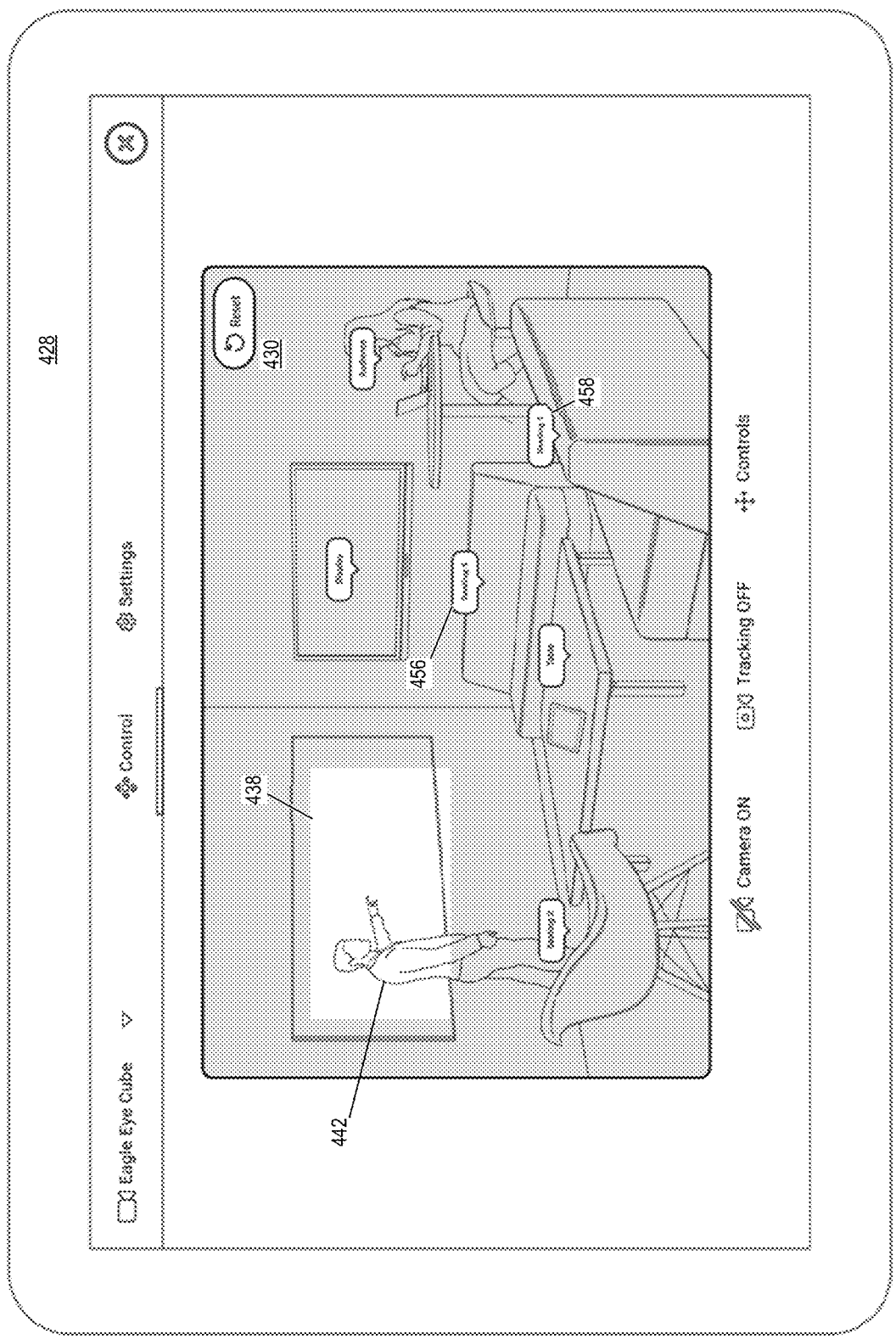
Figure 4K:
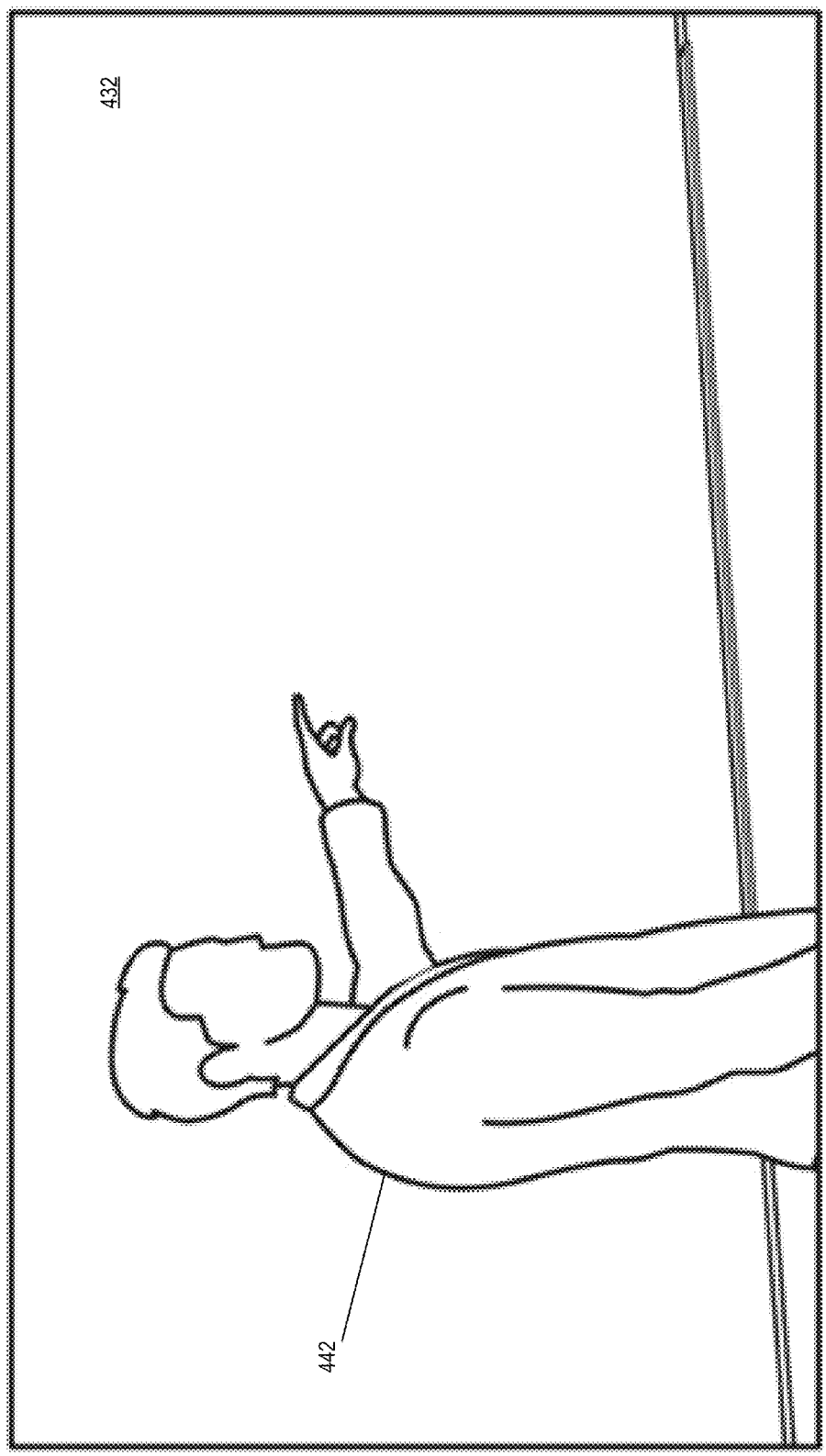
Figure 4L:
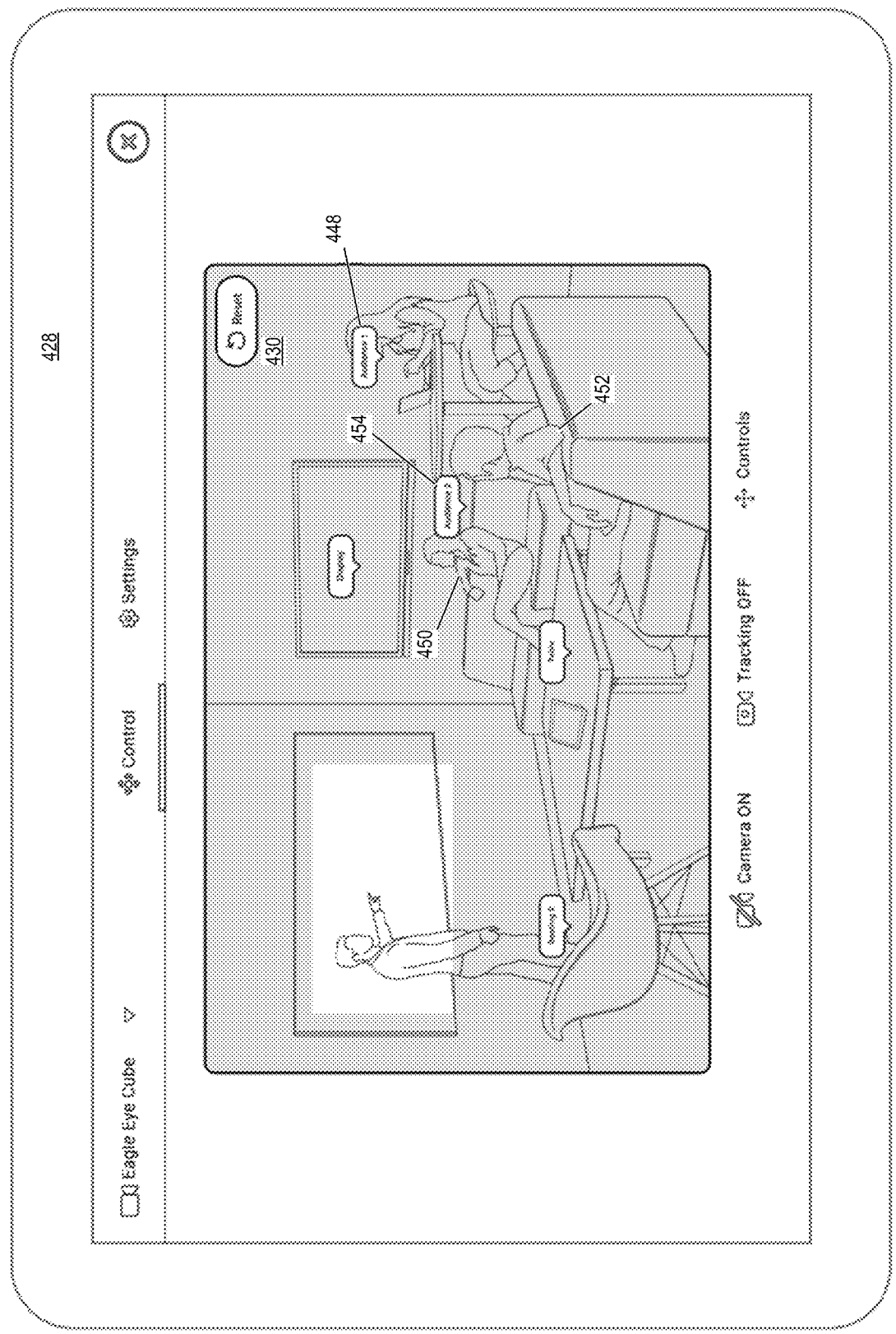
Figure 4N:
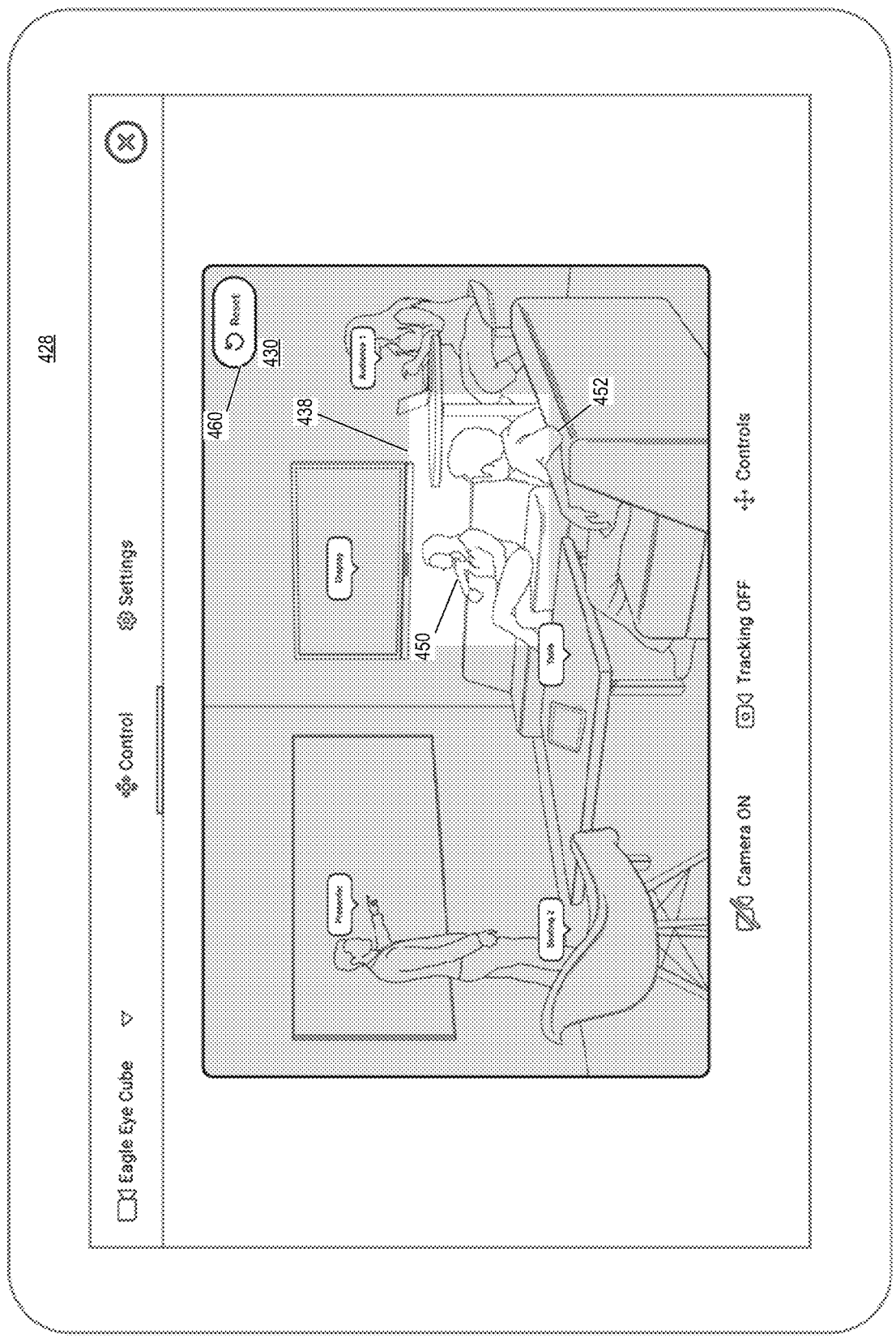
Figure 40:
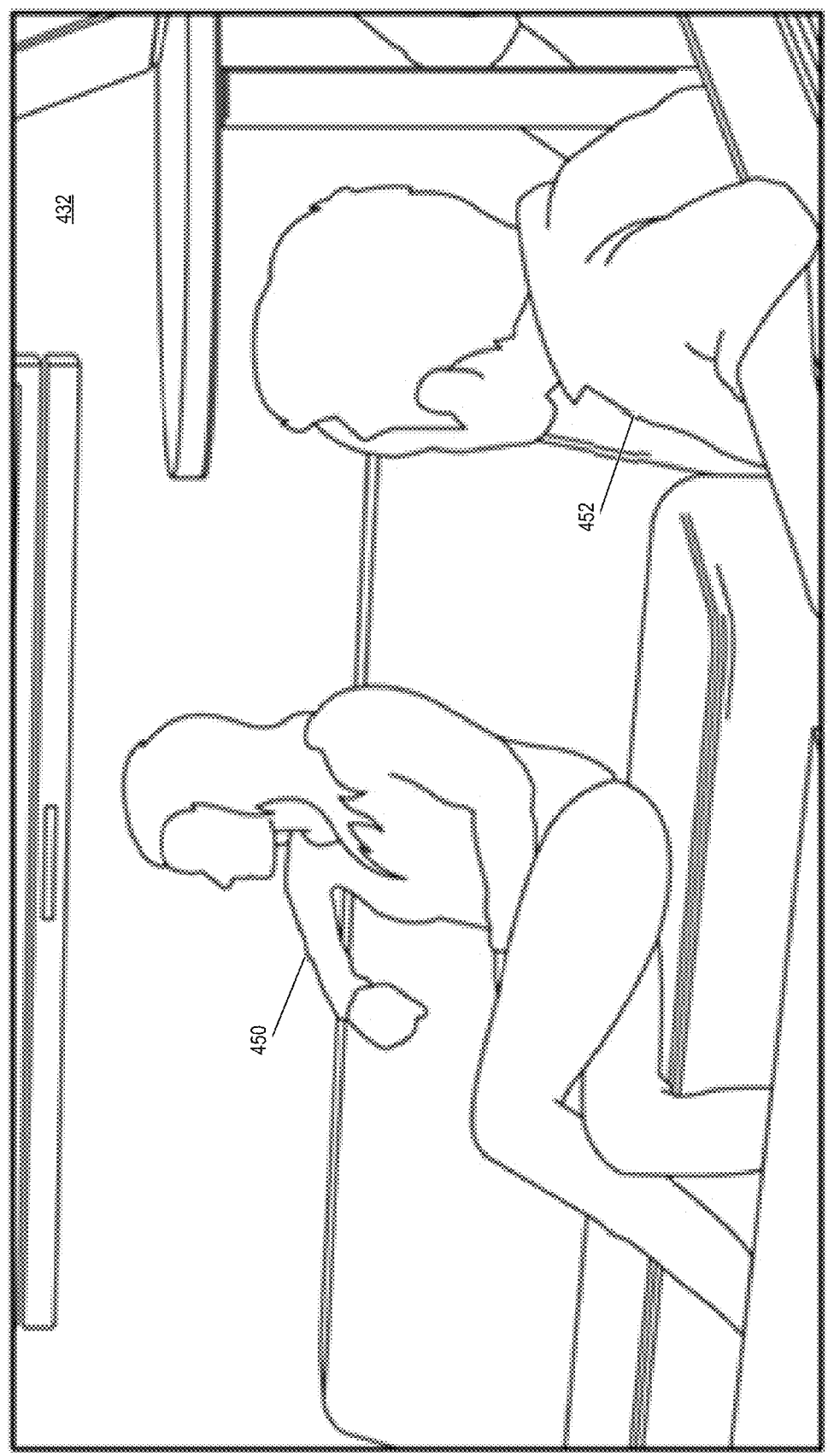
Figure 4P:
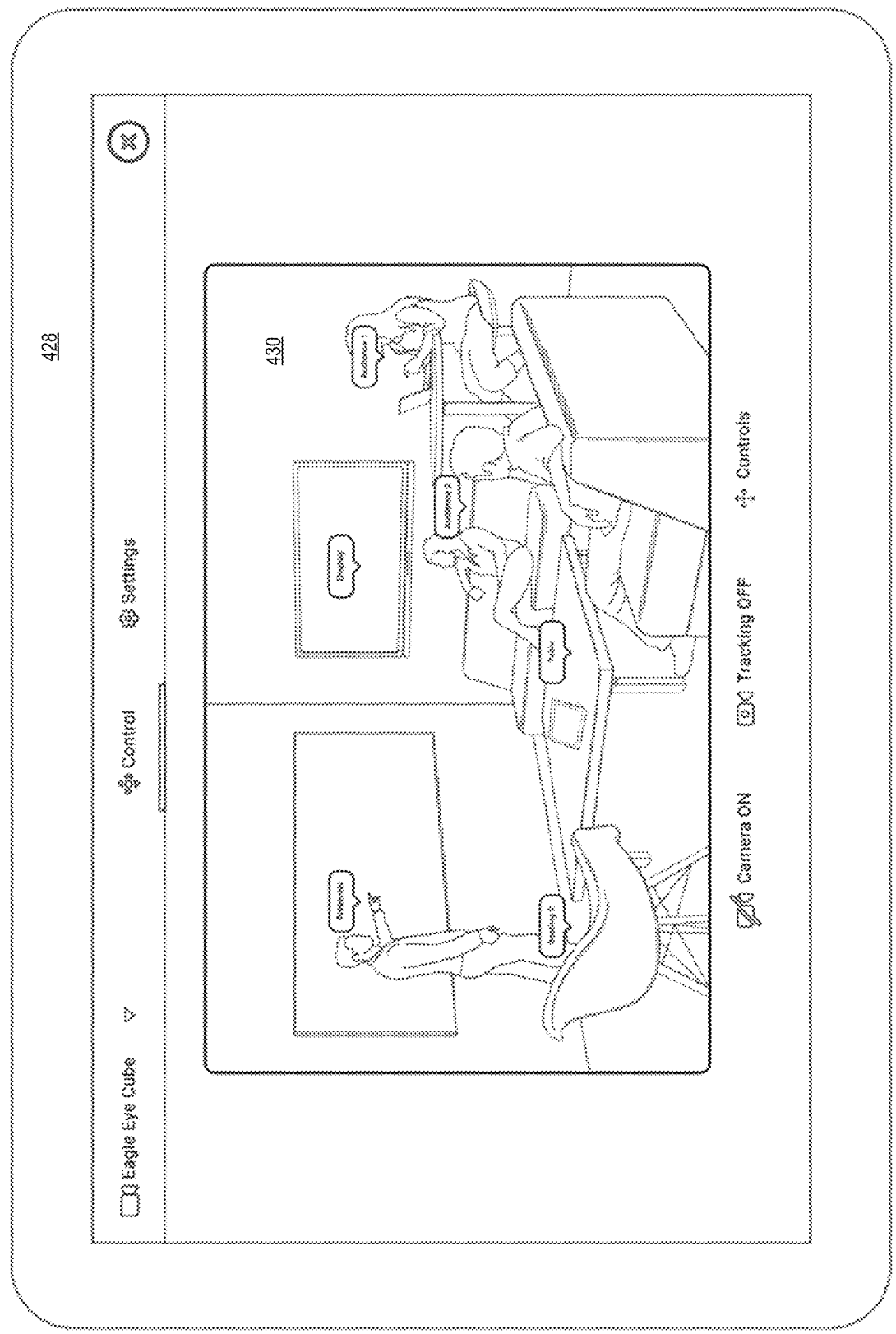
Figure 4Q:

FIG. 3 and FIG. 4A through FIG. 4Q show examples of systems and sequences that use private information with a shared single source of truth. FIG. 3 shows the system (300) using the algorithmic decision maker (308) to control the camera view (312). FIG. 4A shows the room (400) with a video conferencing system comprising the video bar (402). FIG. 4B through FIG. 4Q show the tagged view (430) and the camera view (432) being updated in response to user inputs. The embodiments shown in FIG. 3 and FIG. 4A through FIG. 4Q may be combined and may include or be included within the features and embodiments described in the other figures of the application. The features and elements of FIG. 3 and FIG. 4A through FIG. 4Q are, individually and as a combination, improvements to the technology of video communications and machine learning. The various features, elements, widgets, components, and interfaces shown in FIG. 3 and FIG. 4A through FIG. 4Q may be omitted, repeated, combined, or altered as shown. Accordingly, the scope of the present disclosure should not be considered limited to the specific arrangements shown in FIG. 3 and FIG. 4A through FIG. 4Q.

Turning to FIG. 3, the system (300) uses dynamic camera presets. The system (300) generates the image (302), which is processed by the object detector pipeline (304). The algorithmic decision maker (308) controls the tagged view (310) and the camera (312) based on the output from the object detector pipeline (304) and the sound source localization data (306).

The algorithmic decision maker (308) and the object detector pipeline (304) may include software components that execute on the endpoint that generated the image (302), on a remote endpoint (e.g., the laptop or phone of a remote user), on a cloud based compute system.

The algorithmic decision maker (308) receives the output from the object detector pipeline (304) and receives the sound source localization data (306). Using the output from the object detector pipeline (304) and the sound source localization data (306), the algorithmic decision maker (308) generates a tagged stream (transmitted to the control device (314) and displayed as the tagged view (310)) and generates an adjusted stream (transmitted to a display and displayed as the camera view (312)).

The image (302) is an image that is generated by an endpoint. The image (302) may be extracted from an image stream generated by a camera from the endpoint.

The object detector pipeline (304) includes hardware and software components that detect objects in the image (302). The object detector pipeline (304) outputs bounding boxes and classification values to the algorithmic decision maker (308). In one embodiment, the object detector pipeline (304) may use a single stage detector when incorporated as part of an endpoint (e.g., a video bar). In one embodiment, the object detector pipeline (304) may use a two-stage detector when incorporated as part of a more robust computing system (e.g., a laptop computer, a desktop computer, a cloud-based computer, etc.).

The sound source localization data (306) identifies a location of a sound source in the image (302). The sound source localization data (306) may be generated by the endpoint that captured the image (302). The sound source localization data (306) may include a value that identifies the horizontal location of the sound source in the image (302).

The control device (314) displays the tagged view (310). In one embodiment, the control device (314) is a terminal that receives tagged stream, displays the tagged stream as the tagged view (310), receives user inputs (e.g., through a touch screen), and transmits the user inputs to the algorithmic decision maker (308). After transmitting the user inputs to the algorithmic decision maker (308), the algorithmic decision maker (308) may update the camera view (312) based on the input to the control device (314).

The tagged view (310) is displayed on the control device (314). The tagged view (310) shows an overview of a conference. The tagged view (310) displays the image (302) with a set of tags (318) and highlights the window (316). The window (316) identifies the portion of the tagged view (310) that is displayed in the camera view (312).

The camera view (312) is presented on a display connected to the system (300). For example, the display may be a television screen connected to a video bar that generated the image (302). The camera view (312) changes based on selections of the tags (318) in the tagged view (310). In one embodiment, the camera view (312) is generated from the same images used to generate the tagged view (310). In one embodiment, the camera view (312) is generated using a separate camera that pans and zooms to the area indicated by the window (316).

Turning to FIG. 4A, a video conferencing system in the room (400) uses dynamic camera presets to control the views provided by the video conferencing system. The video conferencing system includes the video bar (402), which is connected to the display (404).

The video bar (402) includes the camera (406). The camera (406) has the field of view (408) of the room (400). The field of view (408) includes views of the board (410), the display (412), the furniture (414) through (424), the laptop (426), and the tablet device (428).

The laptop (426) may wirelessly connect to the video bar. The laptop (426) may show a camera view from the video conferencing system. In one embodiment, the laptop (426) may display a tagged view and be used to control the camera view of the video conferencing system.

The tablet device (428) may be a control device for the video conferencing system. The tablet device (428) may display a tagged view of the room (400) captured with the camera (406).

Turning to FIG. 4B, the tablet device (428) displays the tagged view (430) prior to the tags being identified. FIG. 4B illustrates the tagged view (430) shortly after turning on the video conferencing system. The tagged view (430) is displayed in a control application that includes additional user interface elements to control the video conferencing system.

Turning to FIG. 4C, the camera view (432) shows a view from the camera (406) (of FIG. 4A). The camera view (432) does not show tags.

Turning to FIG. 4D, the tagged view (430) is updated to include a set of tags for the objects in the field of view (408) (of FIG. 4A) of the camera (406) (of FIG. 4A). Each of the tags displayed are generated from bounding boxes, classification values, and confidence scores. The bounding boxes, classification values, and confidence scores are generated with machine learning models from an input image, which is the original image captured by the camera (406) (of FIG. 1A). As an example, the objects detected by the system may include the table (416), the laptop (426), and the seat (414). Bounding boxes, classification values, and confidence scores are generated for each of these objects.

In one embodiment, to display a subset of tags, the bounding boxes for the table (416), the laptop (426), and the seat (414) overlap and may be prioritized. The table (416) has a higher priority than the laptop (426) and the seat (414) has a higher priority than the table (416). The bounding boxes for the table (416) and the laptop (426) are removed so that the tag (434) (named "Seating 4") may be placed in the image without being crowded by additional tags.

The tag (436) (named "Display") is shown in the tagged view (430). The tag (436) is within a bounding box for the display (412), which was detected with a machine learning model. The tag (436) (as well as the other tags displayed in the tagged view (430)) may be selected by a user of the control device (428).

Turning to FIG. 4E, the camera view (432) is updated after the tags are displayed in the tagged view (430) (in FIG. 4D). The camera view (432) does not show tags and shows a view of the room (400) (of FIG. 4A).

Turning to FIG. 4F, the tagged view (430) is updated after selection of the tag (436) (of FIG. 4D). In response to selecting the tag (436) (of FIG. 4D), the tag (436) (of FIG. 4D) is removed from the tagged view (430) and the window (438) is displayed in the tagged view (430).

The window (438) corresponds to an update to the camera view (432) (shown in FIG. 4G). Inside the window (438), the original image is shown. Outside the window (438), the original image altered (e.g., greyed-out as shown) to indicate that the parts of the original image outside of the window (438) may not be shown in the camera view (432).

The tagged view (430) includes the tags (434) and (440). The tag (434) (named "Seating 4") is generated in response to detecting the chair (414). The tag (440) (named "Board") is generated in response to detecting the board (410).

Turning to FIG. 4G, the camera view (432) is updated to show the display (412). The camera view (432) is updated with view settings generated for a bounding box identified for the display (412) with a machine learning model.

Turning to FIG. 4H, two people (442) and (444) have entered and appear in the tagged stream (430). The tags are updated to remove the tags (440) and (434) (of FIG. 4F) and to include the tags (446) and (448).

The tag (446) (named "Presenter") is generated for a bounding box identified for the person (442). In one embodiment, no tag is displayed for the board (410) because the person (442) (and the bounding box generated for the person (442)) has a higher priority than the board (410).

In one embodiment, the tag (448) (named "Audience") is generated for a bounding box identified for the person (444). No tag is displayed for the table (416), the laptop (426), or the seat (414) because the person (444) (and the bounding box generated for the person (444)) has a higher priority than the table (416), the laptop (426), and the seat (414).

Turning to FIG. 4I, the camera view (432) shows the display (412). Even though the tags are updated in FIG. 4H, the camera view (432) has not changed since the system did not receive an input to adjust the view settings.

Turning to FIG. 4J, the tagged view (430), displayed on the control device (428), is updated after selection of the tag (448) (from FIG. 4H, named "Presenter"). The tagged view (430) is updated to move the window (438) (to show the person (442)) and remove the tag (448). The tags (456) and (458) identify different seating areas.

Turning to FIG. 4K, the camera view (432) is updated to show the person (442). The camera view (432) is updated with view settings generated for a bounding box identified for the person (442) with a machine learning model.

Turning to FIG. 4L, two additional people (450) and (452) have entered and appear in the tagged stream (430). The tags are updated to remove the tags (456) and (458) (of FIG. 4J) and to include the tag (454).

In one embodiment, the name for the tag (448) is updated from "Audience 1" to "Audience 2" in response to another tag (the tag (454)) including the name "Audience". The tag (454) (named "Audience 2") is generated from a combined box that combines the bounding boxes identified for the people (450) and (452). The Euclidean distance between the centers of the bounding boxes for the people (450) and (452) meets a threshold to trigger combing the bounding boxes.

Turning to FIG. 4M, the camera view (432) shows the person (442). Even though the tags are updated in FIG. 4L, the camera view (432) has not changed since the system did not receive an input to adjust the view settings.

Turning to FIG. 4N, the tagged view (430), displayed on the control device (428), is updated after selection of the tag (454) (from FIG. 4L, named "Audience 2"). The tagged view (430) is updated to move the window (438) (to show the people (450) and (452)) and remove the tag (454). The user interface element (460) is displayed on the tagged view (430).

Turning to FIG. 4O, the camera view (432) is updated to show the people (450) and (452). The camera view (432) is updated with view settings generated from a combined box formed from the bounding boxes for the people (450) and (452).

Turning to FIG. 4P, the tagged view (430), displayed on the control device (428), is updated after selection of the element (460) (from FIG. 4N). The tagged view (430) is updated to remove the window (438).

Turning to FIG. 4Q, the camera view (432) is updated to show a wide view. The camera view (432) is updated with view settings to show the full field of view of the camera (406) (of FIG. 4A).

FIGS. 5A through 5B illustrate computing systems modified in accordance with the disclosure. Turning to FIG. 5A, FIG. 5A illustrates a possible operational environment for example circuits of this disclosure. Specifically, FIG. 5A illustrates a conferencing apparatus or endpoint (500) in accordance with an embodiment of this disclosure.

The conferencing apparatus or endpoint (500) of FIG. 5A communicates with one or more remote endpoints (520) over a network (518). The endpoint (500) includes an audio module (504) with an audio codec (506), and a video module (508) with a video codec (510). The audio and video modules (504, 508) operatively couple to the control module (502) and the network module (516). The modules (504, 508, 502, 516) include dedicated hardware, software executed by one or more processors, or a combination thereof. In some examples, the video module (508) corresponds to a graphics processing unit (GPU), software executable by the graphics processing unit, a central processing unit (CPU), software executable by the CPU, an image processor (also referred to as an image signal processor (ISP)) that processes raw image data from the camera set (512), an application processor that executes applications and other programs of the modules (504, 508, 502, 516), etc. In some examples, the control module (502) includes a CPU or application processor, executable software, or a combination thereof. In some examples, the network module (516) includes one or more network interface devices, a CPU, software executable by the CPU, or a combination thereof. In some examples, the audio module (504) includes a CPU, software executable by the CPU, a sound card, or a combination thereof. In some examples, the camera set (512) includes an image processor, image processing software, or a combination thereof. The different processors, programs, and applications running on the endpoint (500) may communicate with each other using application programming interfaces (APIs) exposed by the processors, programs, and applications.

The control module (502) of the endpoint (500) generates tags for images from video streams (referred to as streams). The control module (502) may adjust view settings based on user selection of the tags. In one embodiment, the control module (502) includes a tablet that displays the tags and receives the user selection of tags. The control module (502) is further described above in FIG. 5A.

The endpoint (500) may generate sound source localization (SSL) data that identifies the location of a sound source in the images captured by the endpoint (500). In one embodiment, the sound source localization data includes a value that identifies the horizontal location of the loudest sound source in an image captured with the camera set (512).

In general, the endpoint (500) can be a processing device with playback capabilities including conferencing devices, videoconferencing devices, personal computers with audio or video conferencing abilities, laptop computers, mobile devices, smartphones, or any similar type of communication device. The endpoint (500) is configured to generate near-end audio and video streams and to receive far-end audio and video streams from the remote endpoints (520). The endpoint (500) is configured to transmit the near-end audio and video streams to the remote endpoints (520) and to initiate local presentation of the far-end audio and video streams. The endpoint (500) may also be embodied as headphones or earbuds that may process and play audio streams without video streams.

The microphone (526) captures an audio stream and provides the audio stream to the audio module (504) and audio codec (506) for processing. The microphone (526) can be a table or ceiling microphone, a part of a microphone pod, an integral microphone to the endpoint (500), or the like. Additional microphones (528) can also be provided. Throughout this disclosure all descriptions relating to the microphone (526) apply to any additional microphones (528), unless otherwise indicated. The endpoint (500) may use the audio stream captured with the microphone (526) for the near-end audio stream.

The camera set (512) captures a video stream and provides the captured video stream to the video module (508) and video codec (510) for processing to generate the near-end video stream. For each video frame of near-end video stream captured by the camera set (512), the control module (502) or the video module (508) may crop the video frame to the view region based on a selected view. In general, a video frame (also referred to as a frame) is a single still image in a video feed, or video stream, that, together with the other video frames, form the video stream sent between endpoints.

The endpoint (500) uses the codecs (506, 510) to encode the near-end audio stream and near-end video stream according to an encoding standard, such as MPEG-1, MPEG-2, MPEG-4, H.261, H.263, H.264, etc. Then, the network module (516) outputs the encoded near-end audio stream and encoded video stream to the remote endpoints (520) via the network (518) using an appropriate protocol. Similarly, the network module (516) receives the far-end audio and video streams via the network (518) from the remote endpoints (520) and sends these to their respective codecs (506, 510) for processing. Eventually, a speaker (530) outputs the far-end audio stream (received from a remote endpoint (520)), and a display (514) outputs the far-end video stream. The display (514) also outputs the near-end video stream in some embodiments.

FIG. 5B illustrates components of the conferencing endpoint (500) of FIG. 5A with additional detail. The endpoint (500) includes the processing unit (524), the memory (532), the network interface (536), and the general input/output (I/O) interface (538) coupled via the bus (522). As above, the endpoint (500) has the base microphone (526), the speaker (530), the camera set (512), and the display (514).

The processing unit (524) may include one or more processors, including a CPU, a GPU, an application processor, etc. The memory (532) is a computer readable medium that may be any conventional memory such as synchronous dynamic random access memory (SDRAM) and can store modules (534) in the form of software and firmware with instructions, programs and data for controlling the endpoint (500). The stored modules (534) include the various video and audio codecs (510, 506) and software components of the other modules (502, 504, 508, 516) discussed previously. Moreover, the stored modules (534) can include operating systems, a graphical user interface (GUI) that enables users to control the endpoint (500), and other algorithms for processing audio/video streams.

The network interface (536) provides communications between the endpoint (500) and remote endpoints (520). By contrast, the general I/O interface (538) can provide data transmission with local devices such as a keyboard, a mouse, a printer, an overhead projector, a display, external loudspeakers, additional cameras, microphones, etc.

In one embodiment, the endpoint (500) is a video conferencing system comprising a video bar and a control tablet. The video bar includes the speaker (530) the microphone (526) and the camera set (512). The control tablet includes the display (514) as a touch screen display. The video bar and the control tablet may be separate devices that are wired or wirelessly connected for the control tablet to control the video bar and to display a video stream from the camera set (512).

The figures above show diagrams of embodiments that are in accordance with the disclosure. The embodiments of the figures may be combined and may include or be included within the features and embodiments described in the other figures of the application. The features and elements of the figures are, individually and as a combination, improvements to the technology of video communications and machine learning. The various elements, systems, components, and blocks shown in the figures may be omitted, repeated, combined, and/or altered as shown from the figures. Accordingly, the scope of the present disclosure should not be considered limited to the specific arrangements shown in the figures.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

Further, the term "or" in the description is intended to be inclusive or exclusive. For example, "or" between multiple items in a list may be one or more of each item, only one of a single item, each item, or any combination of items in the list.

In the above detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description. Thus, while the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A computer implemented method comprising:
   receiving an image;
   generating, from the image, a list of bounding boxes and a list of classification values;
   generating a set of tags, for the image, from the list of bounding boxes and the list of classification values;
   presenting a tagged image comprising a tag from the set of tags overlayed onto the image;
   receiving, in response to a user input, a tag selection identifying a tag of the set of tags;
   adjusting view settings to focus on a bounding box, from the list of bounding boxes, corresponding to the tag selection; and
   presenting an adjusted image using the view settings.

2. The computer implemented method of claim 1, further comprising:
   receiving the image as part of a real time stream from a camera; and
   presenting the adjusted image as part of an adjusted stream.

3. The computer implemented method of claim 1, further comprising:
   presenting a tagged stream, comprising the tagged image, to a control device; and
   presenting an adjusted stream, comprising the adjusted image, to a display device.

4. The computer implemented method of claim 1, further comprising:
   receiving sound source location data, wherein the sound source location data identifies a horizontal location in the image corresponding to a sound source.

5. The computer implemented method of claim 1, further comprising:
   updating a name of the tag from the set of tags using sound source location data.

6. The computer implemented method of claim 1, further comprising:
   combining at least two bounding boxes from the list of bounding boxes using a distance between the at least two bounding boxes and at least two classification values from the list of classification values.

7. The computer implemented method of claim 1, further comprising:
   combining at least two bounding boxes from the list of bounding boxes by determining an overlap between at least two bounding boxes.

8. The computer implemented method of claim 1, further comprising:
   combining at least two bounding boxes from the list of bounding boxes by prioritizing the at least two bounding boxes.

9. The computer implemented method of claim 1, further comprising:
   combining at least two bounding boxes from the list of bounding boxes by forming a combined box from the at least two bounding boxes.

10. The computer implemented method of claim 1, wherein the tag, from the set of tags, corresponds to the bounding box, from the list of bounding boxes, in a one to one relationship.

11. The computer implemented method of claim 1, wherein the bounding box, from the list of bounding boxes, comprises a set of coordinates that define a portion of the image within which an object in the image was detected.

12. The computer implemented method of claim 1, wherein a classification value, from the list of classification values, identifies a classification for an object detected in the image.

13. The computer implemented method of claim 1, further comprising:
    generating, from the image, a list of confidence scores, wherein a confidence score, from the list of confidence scores, identifies an accuracy of a classification value, from the list of classification values, of an object detected in the image.

14. A system comprising:
    a computing system; and
    an application, executing on the computing system, configured for:
        receiving an image;
        generating, from the image, a list of bounding boxes and a list of classification values;
        generating a set of tags, for the image, from the list of bounding boxes and the list of classification values;
        presenting a tagged image comprising a tag from the set of tags overlayed onto the image;
        receiving, in response to a user input, a tag selection identifying a tag of the set of tags;
        adjusting view settings to focus on a bounding box, from the list of bounding boxes, corresponding to the tag selection; and
        presenting an adjusted image using the view settings.

15. The system of claim 14, wherein the application is further configured for:
    receiving the image as part of a real time stream from a camera; and
    presenting the adjusted image as part of an adjusted stream.

16. The system of claim 14, wherein the application is further configured for:
    presenting a tagged stream, comprising the tagged image, to a control device; and
    presenting an adjusted stream, comprising the adjusted image, to a display device.

17. The system of claim 14, wherein the application is further configured for:
    receiving sound source location data, wherein the sound source location data identifies a horizontal location in the image corresponding to a sound source.

18. The system of claim 14, wherein the application is further configured for:
    updating a name of the tag from the set of tags using sound source location data.

19. The system of claim 14, wherein the application is further configured for:
    combining at least two bounding boxes from the list of bounding boxes using a distance between the at least two bounding boxes and at least two classification values from the list of classification values.

20. A system comprising:
    a control device;
    a display device;
    a computing system connected to the control device and the display device; and
    an application, executing on the computing system, configured for:
        receiving an image;

generating, from the image, a list of bounding boxes and a list of classification values;

generating a set of tags, for the image, from the list of bounding boxes and the list of classification values;

presenting, to the control device, a tagged image comprising a tag from the set of tags overlayed onto the image;

receiving, in response to a user input, a tag selection identifying a tag of the set of tags;

adjusting view settings to focus on a bounding box, from the list of bounding boxes, corresponding to the tag selection; and presenting, to the display device, an adjusted image using the view settings.

* * * * *